US009258165B2

(12) United States Patent
Kawauchi

(10) Patent No.: US 9,258,165 B2
(45) Date of Patent: Feb. 9, 2016

(54) RECEIVING APPARATUS, RECEIVING METHOD AND PROGRAM, AND RECEIVING SYSTEM

(75) Inventor: Hidetoshi Kawauchi, Kanagawa (JP)

(73) Assignee: SONY CORPORATION, Tokyo (JP)

(*) Notice: Subject to any disclaimer, the term of this patent is extended or adjusted under 35 U.S.C. 154(b) by 1059 days.

(21) Appl. No.: 12/788,378

(22) Filed: May 27, 2010

(65) Prior Publication Data
US 2010/0309972 A1 Dec. 9, 2010

(30) Foreign Application Priority Data

Jun. 4, 2009 (JP) ................ P2009-134956

(51) Int. Cl.
H04B 1/66 (2006.01)
H04L 27/00 (2006.01)
H04L 27/26 (2006.01)
H04L 5/00 (2006.01)

(52) U.S. Cl.
CPC ........ *H04L 27/2656* (2013.01); *H04L 27/2666* (2013.01); *H04L 27/2676* (2013.01); *H04L 5/0044* (2013.01)

(58) Field of Classification Search
CPC ............ G06K 9/00; G06F 17/15; H04N 7/18; H04N 7/00
USPC ............... 375/240.01, 260, 324, 146, 226; 708/422, 146, 226, 240.01, 260, 324; 700/94, 422; 345/676, 94
See application file for complete search history.

(56) References Cited

U.S. PATENT DOCUMENTS

| 2002/0176486 | A1* | 11/2002 | Okubo et al. ................ 375/146 |
| 2002/0186791 | A1* | 12/2002 | Foxcroft et al. ............... 375/324 |
| 2003/0236584 | A1* | 12/2003 | Kuwaoka ........................ 700/94 |
| 2006/0098751 | A1* | 5/2006 | Zhang et al. .................. 375/260 |
| 2006/0161611 | A1* | 7/2006 | Wagner et al. ................ 708/422 |

(Continued)

FOREIGN PATENT DOCUMENTS

| EP | 1 054 540 | 11/2000 |
| JP | 2003-18119 A | 1/2003 |

(Continued)

OTHER PUBLICATIONS

Office Action issued Jan. 10, 2013, in Japanese Patent Application No. 2009-134956.
Office Action issued Jun. 11, 2015 in European Patent Application No. 10 004 805.7.
Jonathan Stott, "The P1 Symbol", The P1 Symbol, DTG DVB-T2 Implementers' Seminar, http://www.dtg.org.uk/dtg/t2docs/P1-JonathanStottBBC.pdf, XP008153634, Oct. 9, 2008, pp. 1-16.

*Primary Examiner* — Y Lee
*Assistant Examiner* — Salame Amr
(74) *Attorney, Agent, or Firm* — Oblon, McClelland, Maier & Neustadt, L.L.P.

(57) ABSTRACT

Disclosed herein is a receiving apparatus including a correlation value computer configured, for a digital signal, transmitted on a frame basis, having a correlation between a first section and a second section occupying predetermined intervals at a start part of each frame, to extract signals in two sections separated by time intervals of the first section and the second section and compute correlation values; a maximum value detector configured to detect a maximum value of the correlation values; a digital signal processor configured to execute processing on the digital signal on the basis of a timing with which a maximum value has been detected by the maximum value detector; and a reset processor configured to reset the processing executed in the digital signal processor every time the maximum value is detected.

11 Claims, 19 Drawing Sheets

(56) References Cited

U.S. PATENT DOCUMENTS

2009/0103651 A1  4/2009  Lahtonen et al.
2009/0225822 A1* 9/2009  Tupala et al. ................ 375/226
2010/0321410 A1* 12/2010 Jenks et al. .................. 345/676

FOREIGN PATENT DOCUMENTS

| JP | 2011-501493 A | 1/2011 |
| JP | 2011-512727 A | 4/2011 |
| WO | WO 2004/008706 | 1/2004 |

\* cited by examiner

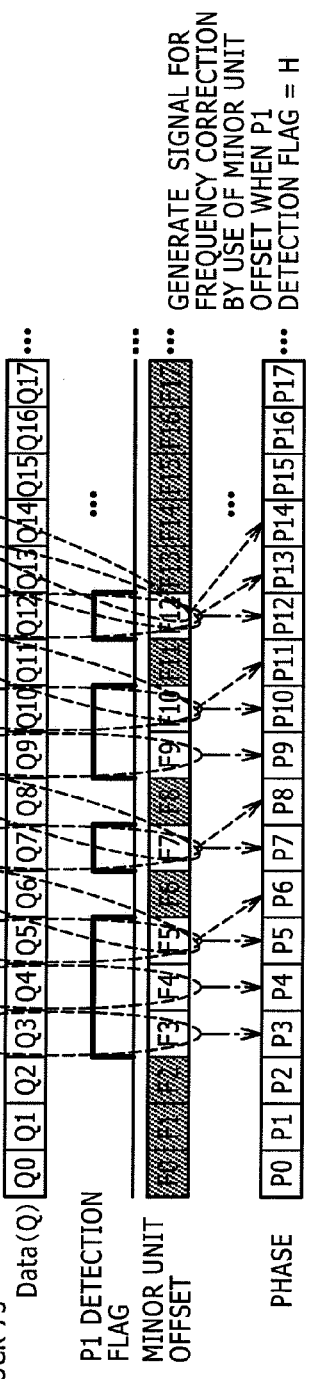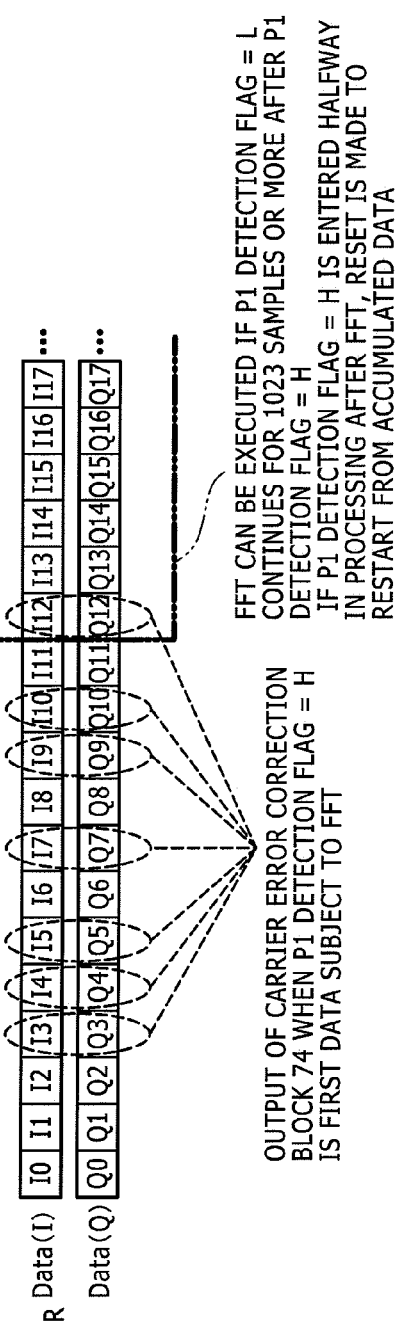

RECEIVING APPARATUS, RECEIVING METHOD AND PROGRAM, AND RECEIVING SYSTEM

BACKGROUND OF THE INVENTION

1. Field of the Invention

The present invention relates to a receiving apparatus, a receiving method and program, and receiving systems and, more particularly, a receiving apparatus, a receiving method and program, and receiving systems that are configured to detect and encode such signals of which incoming intervals are unclear as a P1 signal based on the DVB-T2 (Digital Video Broadcasting-Terrestrial 2) standard.

2. Description of the Related Art

For a terrestrial digital broadcasting standard, the establishment of the DVB-T2 standard for example has been carried on (refer to, for example, Frame structure channel coding and modulation for a second generation digital terrestrial television broadcasting system (DVB-T2), Jun. 30, 2008, at the DVB home page.

Now, referring to FIG. 1, there is shown an exemplary configuration of a digital signal based on the DVB-T2 standard.

As shown in FIG. 1, the types of the frames of a digital signal (hereafter referred to as a DVB-T2 signal) based on the DVB-T2 standard are a frame (hereafter referred to as a T2 frame) based on the DVB-T2 standard and a frame (hereafter referred to as an FEF (Future Extension Frame) part that will be standardized in the future.

At the beginning of each frame, a P1 signal is arranged. A P1 signal is indicative of frame FFT (Fast Fourier Transform) size, communication method information indicative of MISO (Multiple Input Single Output) or SISO (Single Input Single Output), and type information indicative of whether a frame is an FEF part or not. With a T2 frame, P2 signals and data signals are arranged after the P1 signal. To be more specific, each T2 frame is arranged with a start part with P1 signal and P2 signal arranged as a preamble and a data part in which data signals are arranged.

As described above, because the P1 signal is representative of frame information, an apparatus configured to decode a DVB-T2 signal is desired to detect a P1 signal and instantly decode the detected P1 signal.

SUMMARY OF THE INVENTION

It should be noted, however, that, immediately after the starting of the reception of each frame, the size of that frame is unknown. For example, the size of each T2 frame is unknown after a P2 signal has been analyzed. Therefore, a P1 signal incoming interval is unknown, making it difficult to set a P1 signal detection range. Consequently, a P1 signal may not be detected by use of a detection method in which a position at which a correlation value is maximum within a detection range provides a detection position, for example.

Therefore, the present invention addresses the above-identified and other problems associated with related-art methods and apparatuses and solves the addressed problems by providing a receiving apparatus, a receiving method and program, and receiving systems that are configured to detect signals of which incoming intervals are unknown, such as P1 signals based on the DVB-T2 standard, and decode the detected signals.

In carrying out the invention and according to a first mode thereof, there is provided a receiving apparatus. The receiving apparatus has correlation value computation means configured, for a digital signal, transmitted on a frame basis, having a correlation between a first section and a second section occupying predetermined intervals at a start part of each frame, to extract signals in two sections separated by time intervals of the first section and the second section and compute correlation values; maximum value detection means configured to detect a maximum value of the correlation values; digital signal processing means configured to execute processing on the digital signal on the basis of a timing with which a maximum value has been detected by the maximum value detection means; and reset processing means configured to reset the processing executed in the digital signal processing means every time the maximum value is detected.

A receiving method and a program in the first mode of the present invention correspond to the above-mentioned receiving apparatus of the first mode of the present invention.

In the first mode of the present invention, for a digital signal, transmitted on a frame basis, having a correlation between a first section and a second section occupying predetermined intervals at a start part of each frame, signals in two sections separated by time intervals of the first section and the second section are extracted and correlation values are computed; a maximum value of the correlation values is detected; processing is executed on the digital signal on the basis of a timing with which a maximum value has been detected by the maximum value detection means; and the processing executed in the digital signal processing means is reset every time the maximum value is detected.

In carrying out the invention and according to a second mode thereof, there is provided a receiving system. This receiving system has acquisition means configured to acquire a signal from a transmission path; and transmission path decode processing means configured to execute transmission path decode processing on the signal acquired by the acquisition means. This transmission path decode processing means has correlation value computation means configured, for a digital signal, transmitted on a frame basis, having a correlation between a first section and a second section occupying predetermined intervals at a start part of each frame, to extract signals in two sections separated by time intervals of the first section and the second section and compute correlation values; maximum value detection means configured to detect a maximum value of the correlation values; digital signal processing means configured to execute processing on the digital signal on the basis of a timing with which a maximum value has been detected by the maximum value detection means; and reset processing means configured to reset the processing executed in the digital signal processing means every time the maximum value is detected.

In the second mode of the present invention, a signal is acquired from a transmission path and transmission path decode processing is executed on the acquired signal. In the transmission path decode processing, for a digital signal, transmitted on a frame basis, having a correlation between a first section and a second section occupying predetermined intervals at a start part of each frame, signals in two sections separated by time intervals of the first section and the second section are extracted and correlation values are computed; a maximum value of the correlation values is detected; processing is executed on the digital signal on the basis of a timing with which a maximum value has been detected by the maximum value detection means; and the processing executed in the digital signal processing means is reset every time the maximum value is detected.

In carrying out the invention and according to a third mode thereof, there is provided a receiving system. This receiving system has transmission path decode processing means configured to execute transmission path decode processing on a signal acquired from a transmission path; and information source decode processing means configured to execute information source decode processing on the signal after the transmission path decode processing executed by the transmission path decode processing means. This transmission path decode processing means has correlation value computation means configured, for a digital signal, transmitted on a frame basis, having a correlation between a first section and a second section occupying predetermined intervals at a start part of each frame, to extract signals in two sections separated by time intervals of the first section and the second section and compute correlation values; maximum value detection means configured to detect a maximum value of the correlation values; digital signal processing means configured to execute processing on the digital signal on the basis of a timing with which a maximum value has been detected by the maximum value detection means; and reset processing means configured to reset the processing executed in the digital signal processing means every time the maximum value is detected.

In the third mode of the present invention, transmission path decode processing is executed on a signal acquired from a transmission path and information source decode processing is executed on the signal after the transmission path decode processing. In the transmission path decode processing, for a digital signal, transmitted on a frame basis, having a correlation between a first section and a second section occupying predetermined intervals at a start part of each frame, signals in two sections separated by time intervals of the first section and the second section are extracted and correlation values are computed; a maximum value of the correlation values is detected; processing is executed on the digital signal on the basis of a timing with which a maximum value has been detected by the maximum value detection means; and the processing executed in the digital signal processing means is reset every time the maximum value is detected.

In carrying out the invention and according to a fourth mode thereof, there is provided a receiving system. This receiving system has transmission path decode processing means configured to execute transmission path decode processing on a signal acquired from a transmission path; and output means configured to output at least one of image data and audio data on the basis of the signal after the transmission path decode processing executed by the transmission path decode processing means. This transmission path decode processing means has correlation value computation means configured, for a digital signal, transmitted on a frame basis, having a correlation between a first section and a second section occupying predetermined intervals at a start part of each frame, to extract signals in two sections separated by time intervals of the first section and the second section and compute correlation values; maximum value detection means configured to detect a maximum value of the correlation values; digital signal processing means configured to execute processing on the digital signal on the basis of a timing with which a maximum value has been detected by the maximum value detection means; and reset processing means configured to reset the processing executed in the digital signal processing means every time the maximum value is detected.

In the fourth mode of the present invention, transmission path decode processing is executed on a signal acquired from a transmission path and image data or audio data is outputted on the basis of the signal after the transmission path decode processing. In the transmission path decode processing, for a digital signal, transmitted on a frame basis, having a correlation between a first section and a second section occupying predetermined intervals at a start part of each frame, signals in two sections separated by time intervals of the first section and the second section are extracted and correlation values are computed; a maximum value of the correlation values is detected; processing is executed on the digital signal on the basis of a timing with which a maximum value has been detected by the maximum value detection means; and the processing executed in the digital signal processing means is reset every time the maximum value is detected.

In carrying out the invention and according to a fifth mode thereof, there is provided a receiving system. This receiving system has transmission path decode processing means configured to execute transmission path decode processing on a signal acquired from a transmission path; and recording control means configured to control recording of the signal after the transmission path decode processing executed by the transmission path decode processing means. This transmission path decode processing means has correlation value computation means configured, for a digital signal, transmitted on a frame basis, having a correlation between a first section and a second section occupying predetermined intervals at a start part of each frame, to extract signals in two sections separated by time intervals of the first section and the second section and compute correlation values; maximum value detection means configured to detect a maximum value of the correlation values; digital signal processing means configured to execute processing on the digital signal on the basis of a timing with which a maximum value has been detected by the maximum value detection means; and reset processing means configured to reset the processing executed in the digital signal processing means every time the maximum value is detected.

In the fifth mode of the present invention, transmission path decode processing is executed on a signal acquired from a transmission path and the recording of the signal after the transmission path decode processing is controlled. In the transmission path decode processing, for a digital signal, transmitted on a frame basis, having a correlation between a first section and a second section occupying predetermined intervals at a start part of each frame, signals in two sections separated by time intervals of the first section and the second section are extracted and correlation values are computed; a maximum value of the correlation values is detected; processing is executed on the digital signal on the basis of a timing with which a maximum value has been detected by the maximum value detection means; and the processing executed in the digital signal processing means is reset every time the maximum value is detected.

As described and according to the embodiments of the present invention, signals of which incoming intervals are unknown, such as P1 signals based on the DVB-T2 standard, can be detected and the detected signals can be decoded.

BRIEF DESCRIPTION OF THE DRAWINGS

FIGS. 13A, 13B, 13C, 13D, and 13E are a timing chart indicative of a flow of processing to be executed by the P1 decode processing unit shown in FIG. 7;

DETAILED DESCRIPTION OF THE PREFERRED EMBODIMENTS

Premises of the Present Invention

Figure 1:
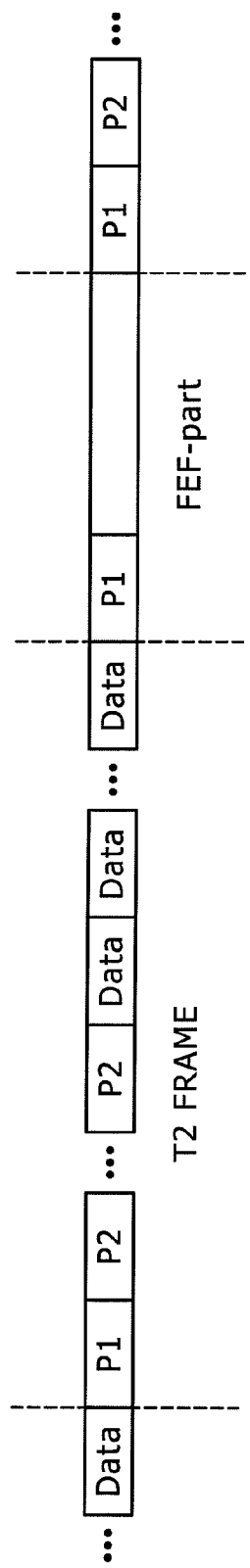
FIG. 1 is a diagram illustrating an exemplary configuration of a digital signal based on the DVB-T2 standard.
Figure 2:
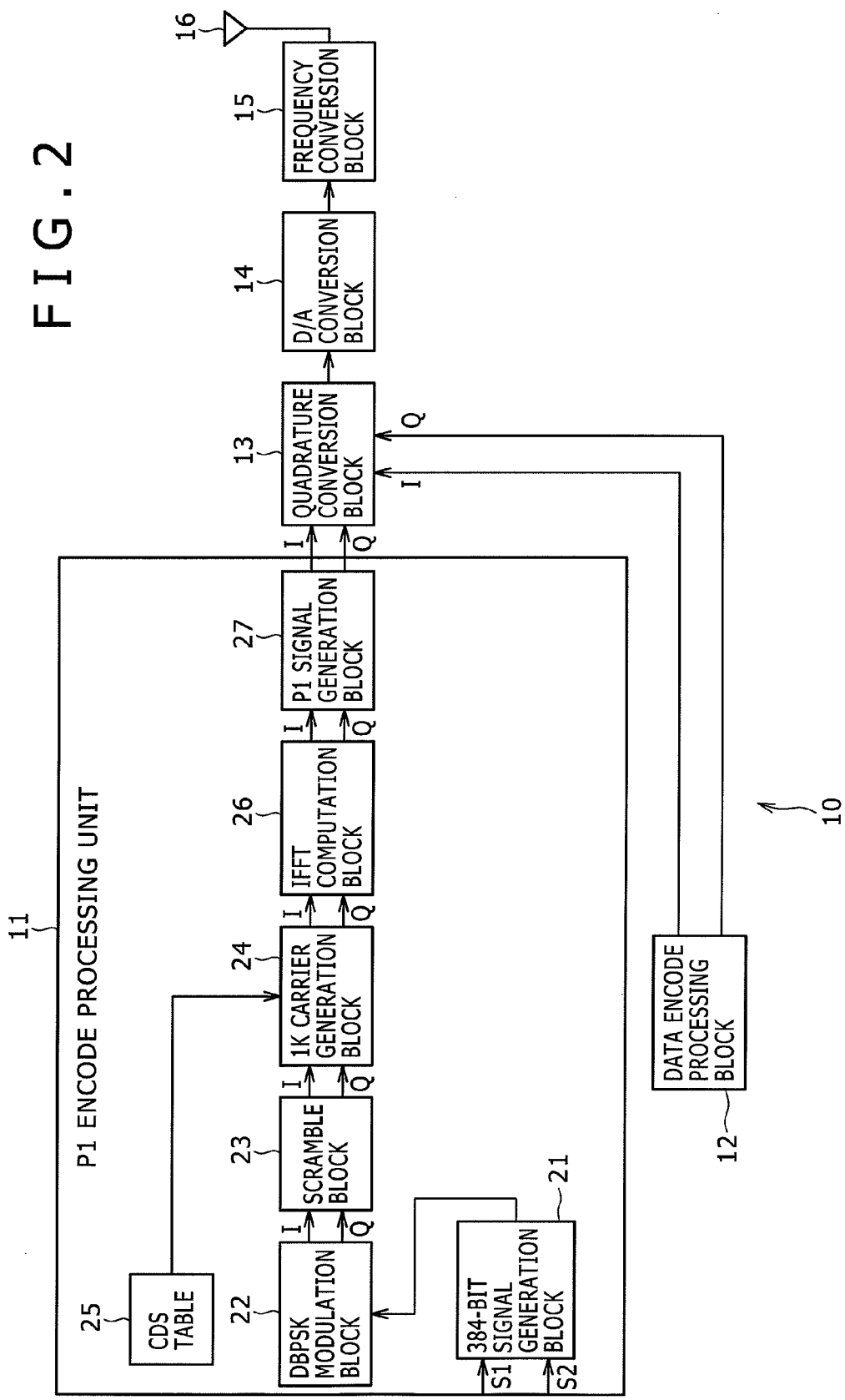
FIG. 2 is a block diagram illustrating an exemplary configuration of a transmission system configured to transmit DVB-T2 signals.

An exemplary configuration of a transmission system:

Now, referring to FIG. 2, there is shown an exemplary configuration of a transmission system 10 configured to transmit DVB-T2 signals.

A transmission system 10 is configured by a P1 encode processing unit 11, a data encode processing block 12, a quadrature conversion block 13, a D/A conversion block 14, a frequency conversion block 15, and an antenna 16. The transmission system 10 transmits DVB-T2 signals of terrestrial digital broadcasting, satellite digital broadcasting, and so on, for example.

The P1 encode processing unit 11, configured by a 384-bit signal generation block 21, a DBPSK (Differential Binary Phase Shift Keying) modulation block 22, a scramble block 23, a 1K carrier generation block 24, a CDS table 25, an IFFT (Inverse Fast Fourier Transform) computation block 26, and a P1 signal generation block 27, generates a P1 signal.

Into the 384-bit signal generation block 21, a S1 signal and a S2 signal are entered that are indicative of frame FFT size, communication scheme information, and type information. The 384-bit signal generation block 21 generates a signal having 384 bits by mapping the S1 signal and the S2 signal onto a predetermined 0, 1 sequence.

The DBPSK modulation block 22 executes DBPSK modulation on a 384-bit signal generated by the 384-bit signal generation block 21 and supplies a resultant DBPSK modulated signal having I component and Q component to the scramble block 23.

The scramble block 23 encrypts the DBPSK modulated signal supplied from the DBPSK modulation block 22 by M sequence.

The 1K carrier generation block 24 reads a valid carrier number from the CDS table 25, references the read valid carrier number, and maps the DBPSK modulated signal composed of I component and Q component onto the 1K carrier encrypted by the scramble block 23. The CDS table 25 stores the numbers of valid carriers of 1K carriers.

The IFFT computation block 26 executes IFFT computation on the 1K carrier signal composed of I component and Q component obtained as a result of the mapping on the 1K carrier by the 1K carrier generation block 24 and supplies a resultant IFFT signal composed of I component and Q component to the P1 signal generation block 27.

The P1 signal generation block 27 generates a P1 signal composed of I component and Q component by use of the IFFT signal supplied from the IFFT computation block 26 and supplies the generated P1 signal to the quadrature conversion block 13.

The data encode processing block 12 executes encoding processing, such as DBPSK modulation, encryption, 1K carrier mapping, and IFFT computation, on each frame size indicative signal and broadcast signal entered from the outside, thereby generating the I component and the Q component of a P2 signal and a data signal. Then, the data encode processing block 12 supplies the P2 signal and the data signal each having the I component and the Q component to the quadrature conversion block 13.

The quadrature conversion block 13 executes quadrature modulation on a DVB-T2 signal made up of a P1 signal supplied from the P1 signal generation block 27 and a P2 signal and a data signal supplied from the data encode processing block 12.

The D/A conversion block 14 executes D/A conversion on the DVB-T2 signal obtained as a result of the quadrature modulation executed by the quadrature conversion block 13 and supplies a resultant analog signal to the frequency conversion block 15.

The frequency conversion block 15 executes frequency conversion on the analog signal supplied from the D/A conversion block 14 to obtain an RF (Radio Frequency) signal. This RF signal is transmitted by use of a transmission path, such as terrestrial wave or satellite wave, via the antenna 16.

Figure 3:
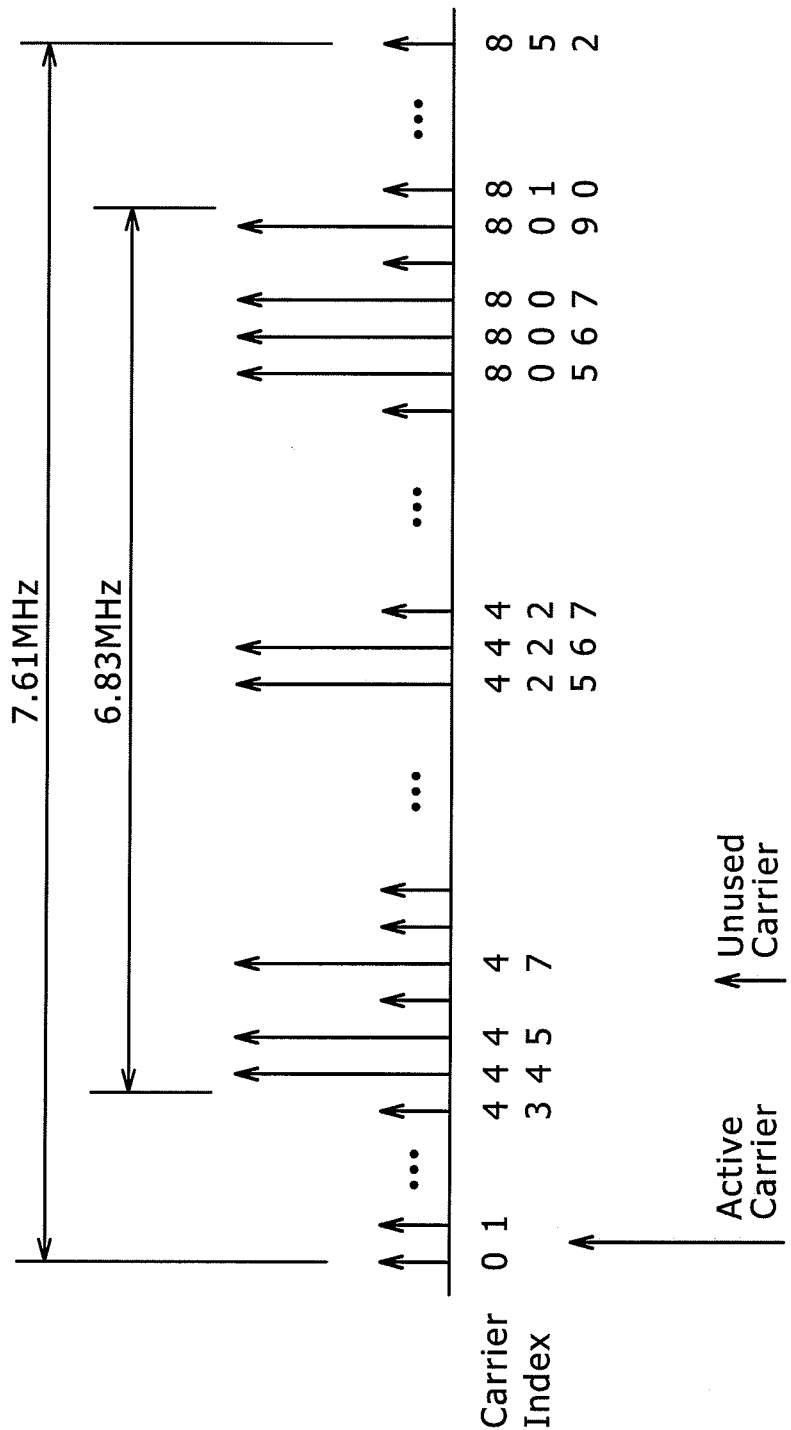
FIG. 3 is a diagram explaining an information transmission carrier.

Explanation of Valid Carrier:

Referring to FIG. 3, there is shown an information transmission carrier among the 1K signal carriers generated by the 1K carrier generation block 24.

As shown in FIG. 3, of the 1024 1K carriers, 853 carriers are allocated as information transmission carriers. Of these information transmission carriers, 384 carriers are allocated as valid carriers, which are used for carriers that transmit substantial information.

Figure 4:
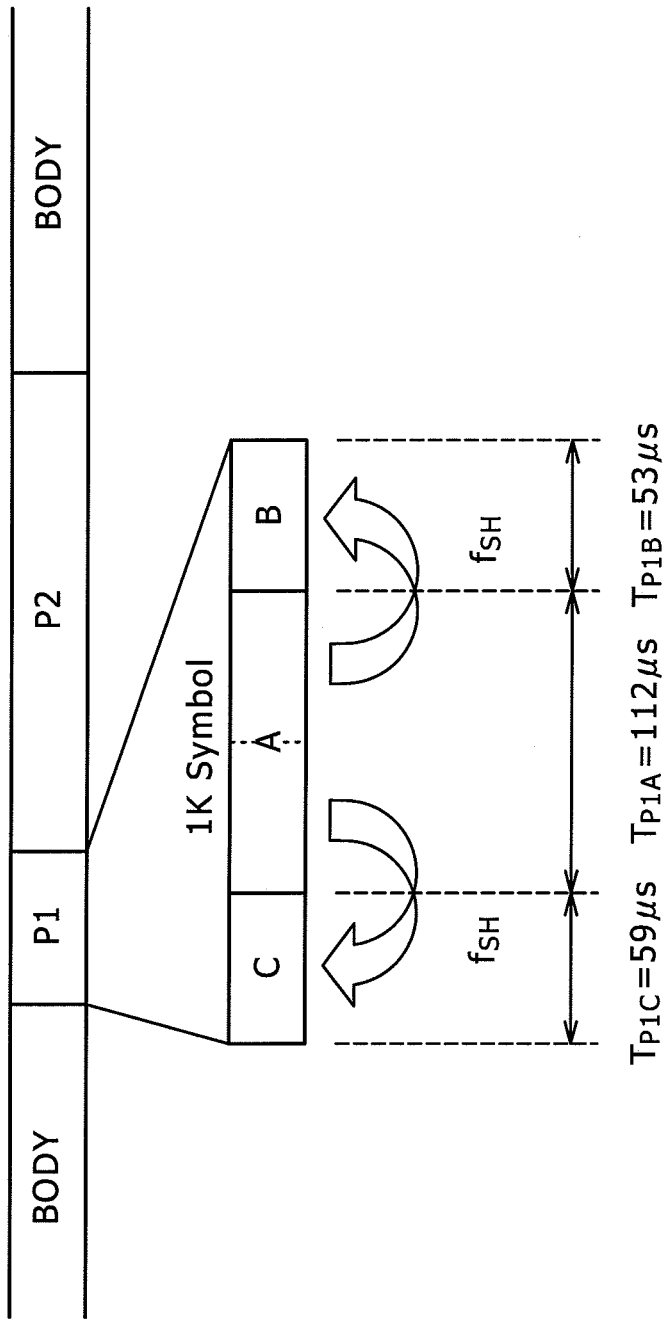
FIG. 4 is a diagram illustrating an exemplary configuration of a P1 signal.

Explanation of P1 Signal:

Referring to FIG. 4, there is shown an exemplary configuration of a P1 signal.

As shown in FIG. 4, a P1 signal has a structure of C-A-B, in which, in front of actual information part A of the P1 signal, a part of actual information part A is arranged as duplicated as duplicate part C and, after actual information part A, a part other than duplicate part C of actual information part A is arranged as duplicated as duplicate part B. To be more specific, each P1 signal has a section of actual information part A and sections of duplicate part B and duplicate part C that have a correlation with the section of actual information part A. It should be noted that duplicate part C and duplicate part B are inserted by raising the frequency by $f_{SH}$ relative to actual information part A.

Figure 5:
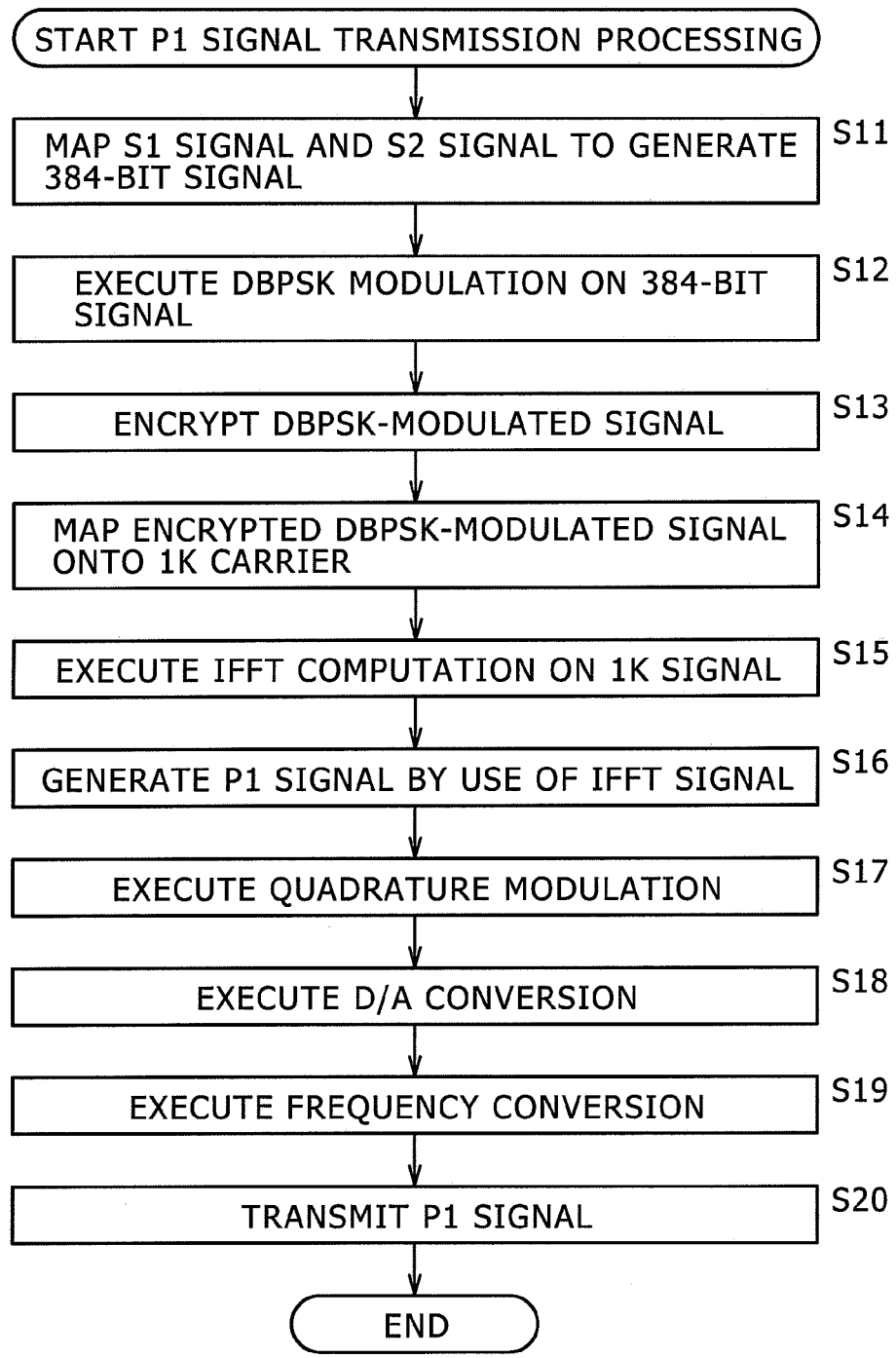
FIG. 5 is a flowchart indicative of P1 signal transmission processing to be executed by the transmission system.

Explanation of the Transmission System:

Referring to FIG. 5, there is shown a flowchart for explaining P1 signal transmission processing to be executed by the transmission system 10.

In step S11 shown in FIG. 5, the 384-bit signal generation block 21 maps an S1 signal and an S2 signal entered from the output onto a predetermined 0, 1 sequence to generate a 384-bit signal.

In step S12, the DBPSK modulation block 22 executes DBPSK modulation on the 384-bit signal generated by the 384-bit signal generation block 21 and supplies a resultant DBPSK modulated signal to the scramble block 23.

In step S13, the scramble block 23 encrypts the DBPSK modulated signal supplied from the DBPSK modulation block 22 by M sequence.

In step S14, the 1K carrier generation block 24 reads a valid carrier number from the CDS table 25 and references the read valid carrier number to map the DBPSK modulated signal encrypted by the scramble block 23 onto the 1K carrier.

In step S15, the IFFT computation block 26 executes an IFFT computation on the 1K signal obtained as a result of the 1K carrier mapping by the 1K carrier generation block 24 and supplies a resultant IFFT signal to the P1 signal generation block 27.

In step S16, the P1 signal generation block 27 generates a P1 signal having C-A-B structure by use of the IFFT signal supplied from the IFFT computation block 26 and supplies the generated P1 signal to the quadrature conversion block 13.

In step S17, the quadrature conversion block 13 executes quadrature modulation on the P1 signal supplied from the P1 signal generation block 27.

In step S18, the D/A conversion block 14 executes D/A conversion on the signal obtained as a result of the quadrature conversion by the quadrature conversion block 13 and supplies a resultant analog signal to the frequency conversion block 15.

In step S19, the frequency conversion block 15 executes frequency conversion on the analog signal supplied from the D/A conversion block 14, thereby obtaining an RF signal.

In step S20, the antenna 16 transmits the RF signal of the P1 signal supplied from the frequency conversion block 15, upon which the processing comes to an end.

A First Embodiment

Figure 6:
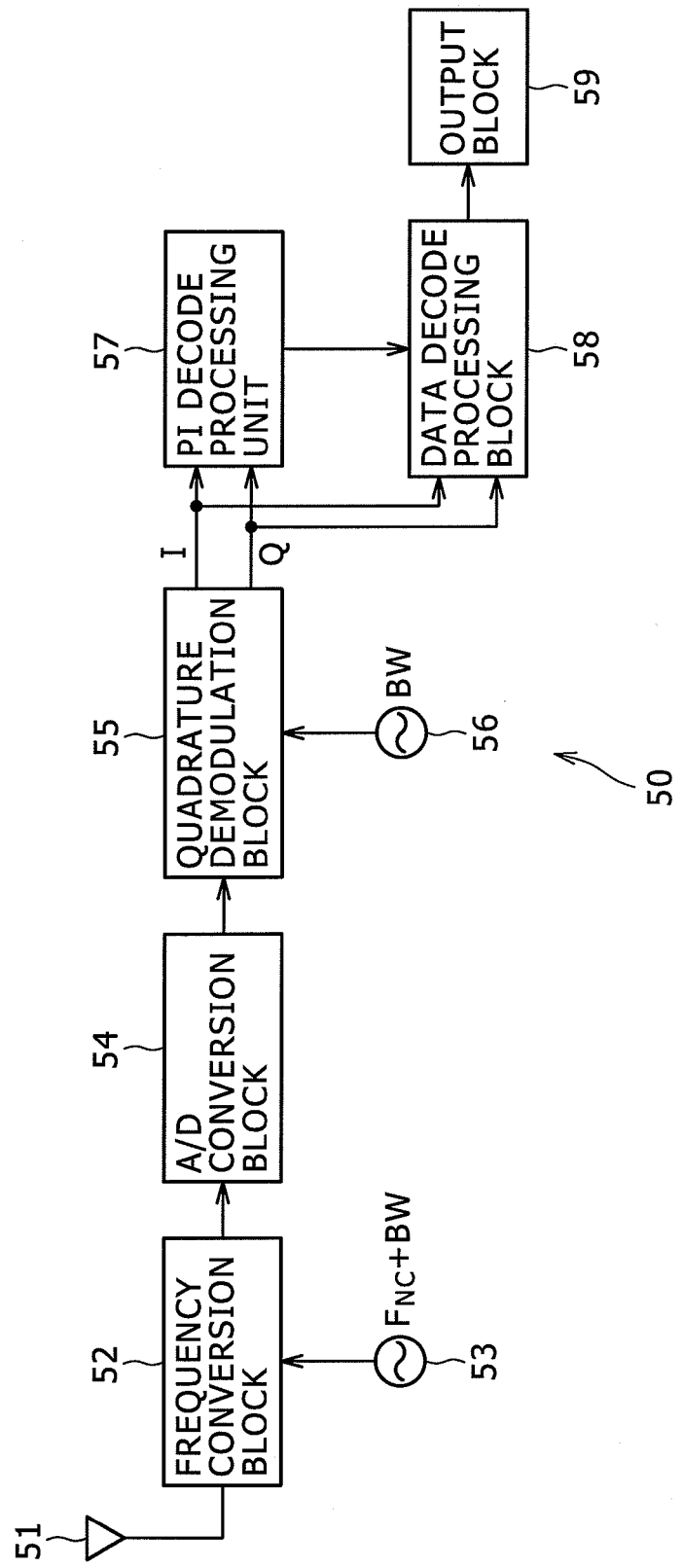
FIG. 6 is a block diagram illustrating an exemplary configuration of a receiving system practiced as a first embodiment of the invention.

Exemplary Configuration of the First Embodiment of a Receiving System:

Referring to FIG. 6, there is shown a block diagram illustrating an exemplary configuration of a receiving system practiced as a first embodiment of the invention.

A receiving system 50 shown in FIG. 6 has antenna 51, a frequency conversion block 52, a local oscillation block 53, an A/D conversion block 54, a quadrature demodulation block 55, a local oscillation block 56, a P1 decode processing unit 57, a data decode processing block 58, and an output block 59.

The antenna 51 captures the RF signal of a DVB-T2 signal transmitted from the transmission system 10 shown in FIG. 2 and supplies the captured RF signal to the frequency conversion block 52.

The frequency conversion block 52 multiplies the RF signal supplied from the antenna 51 by the carrier wave of an oscillation frequency ($F_{NC}$+BW) supplied from the local oscillation block 53 to convert the RF signal into an IF signal of center frequency $F_{NC}$. The frequency conversion block 52 supplies this IF signal to the A/D conversion block 54.

The local oscillation block 53 generates the carrier wave of the oscillation frequency ($F_{NC}$+BW) and supplies the generated carrier wave to the frequency conversion block 52.

The A/D conversion block 54 executes A/D conversion on the IF signal supplied from the frequency conversion block 52 and supplies a resultant digitized IF signal to the quadrature demodulation block 55.

The quadrature demodulation block 55 executes quadrature demodulation on the IF signal supplied from the A/D conversion block 54 by use of the carrier wave of the oscillation frequency BW supplied from the local oscillation block 56. The quadrature demodulation block 55 supplies a signal composed of I component and Q component obtained as a result of the quadrature demodulation to the P1 decode processing unit 57 and the data decode processing block 58. The local oscillation block 56 generates the carrier wave of the oscillation frequency BW and supplies the generated carrier wave to the quadrature demodulation block 55.

The P1 decode processing unit 57 detects the P1 signal from the signal supplied from the quadrature demodulation block 55 to decode the P1 signal. Details of the P1 decode processing unit 57 will be described later with reference to FIG. 7.

The data decode processing block 58 detects a P2 signal and a data signal from the signal supplied from the quadrature demodulation block 55 by use of an S1 signal and an S2 signal obtained as a result of the decoding by the P1 decode processing unit 57 and decodes the detected P2 signal and data signal. The data decode processing block 58 supplies a broadcast signal obtained as a result of the decoding to the output block 59.

The output block 59 is composed of a display monitor and a loudspeaker, for example. The output block 59 is configured to display images and outputs sound on the basis of the broadcast signal supplied from the data decode processing block 58.

Figure 7:
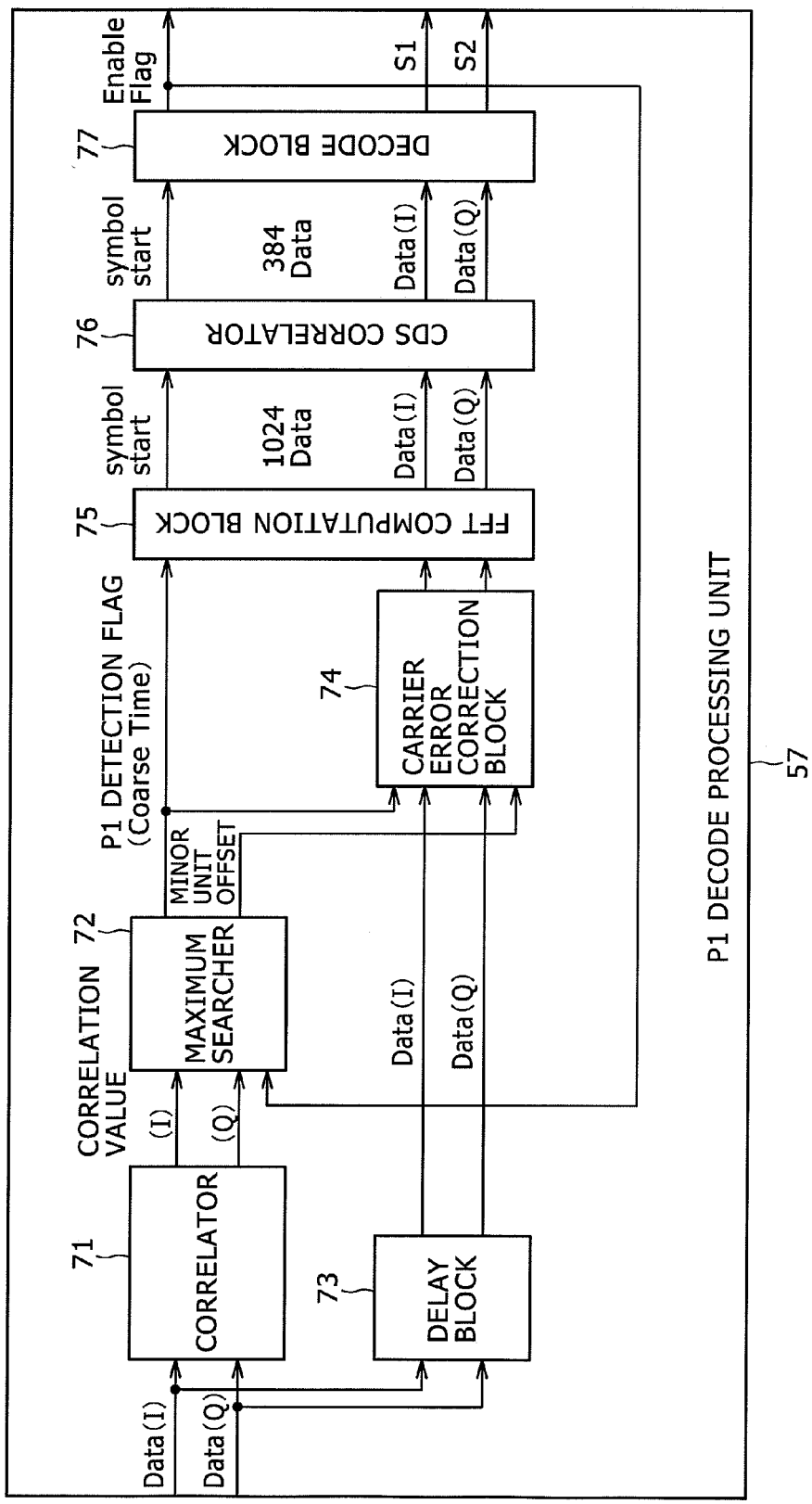
FIG. 7 is a block diagram illustrating a detail exemplary configuration of a P1 decode processing unit.

Detail Exemplary Configuration of the P1 Decode Processing Unit:

Referring to FIG. 7, there is shown a block diagram illustrating a detail exemplary configuration of the P1 decode processing unit 57.

As shown in FIG. 7, the P1 decode processing unit 57 is composed of a correlator 71, a maximum searcher 72, a delay block 73, a carrier error correction block 74, an FFT computation block 75, a CDS correlator 76, and a decode block 77.

The correlator 71 obtains a correlation value for each of I component and Q component of a signal supplied from the quadrature demodulation block 55 shown in FIG. 6. To be more specific, for each of I component and Q component, the correlator 71 obtains a multiplication value of a correlation value of signals of two sections separated from each other by a time interval between duplicate part C and actual information part A of a signal supplied from the quadrature demodulation block 55 and a correlation value of signals of two sections separated from each other by a time interval between duplicate part B and a part other than actual information part A. Then, the correlator 71 supplies an obtained correlation value to the maximum searcher 72. Details of the correlator 71 will be described later with reference to FIG. 8 and so on.

The maximum searcher 72 executes P1 signal detection processing by use of the correlation value of I component and the correlation value of Q component supplied from the correlator 71 and supplies a P1 detection flag indicative of a result of this detection processing to the carrier error correction block 74 and the FFT computation block 75. In addition, by use of a phase represented by the correlation value of I component and the correlation value of Q component supplied from the correlator 71, the maximum searcher 72 obtains an offset of a unit smaller than the carrier unit of the frequency of each signal actually entered in the P1 decode processing unit 57 (hereafter referred to as a minor unit offset) for the frequency of each normal carrier. Then, the maximum searcher 72 supplies the obtained minor unit offset to the carrier error correction block 74. Details of the maximum searcher 72 will be described later with reference to FIG. 11 and so on.

The delay block 73 delays the I component and the Q component of the signal supplied from the quadrature demodulation block 55 by an amount in the correlator 71 and supplies a resultant delayed signal to the carrier error correction block 74.

If the P1 detection flag supplied from the maximum searcher 72 is indicative of the detection of a P1 signal, the carrier error correction block 74 corrects the frequency error of the carrier of the signal supplied from the delay block 73 on the basis of a minor unit offset and supplies the corrected signal to the FFT computation block 75. If the P1 detection flag is indicative of non-detection of a P1 signal, the carrier error correction block 74 corrects the frequency error of the carrier of a signal supplied from the delay block 73 on the basis of the minor unit offset supplied with the immediately preceding P1 detection flag indicative of the detection of a P1 signal and supplies the corrected signal to the FFT computation block 75.

On the basis of the P1 detection flag supplied from the maximum searcher 72, the FFT computation block 75 executes FFT computation on the I component and the Q component of the signal having 1024 pieces of data supplied from the carrier error correction block 74 and supplies the resultant I component and Q component of the signal having 1024 pieces of data to the CDS correlator 76. In addition, the FFT computation block 75 supplies a symbol start signal to the CDS correlator 76 at the start of outputting an FFT computation result.

In response to the symbol start signal supplied from the FFT computation block 75, the CDS correlator 76 references valid carrier numbers stored in a memory, not shown, to extract the I component and the Q component of a signal having 384 pieces of data of the valid carrier from the I component and the Q component of the signal having 1024 pieces of data supplied from the FFT computation block 75 and supplies the extracted I component and Q component to the decode block 77. In addition, the CDS correlator 76 supplies a symbol start signal to the decode block 77 at the start of outputting the signal having 384 pieces of data.

Also, in response to the symbol start signal supplied from the FFT computation block 75, the CDS correlator 76 obtains the correlation value of the I component and the Q component of the signals having 1024 pieces of data supplied from the FFT computation block 75. On the basis of the obtained correlation value, the CDS correlator 76 obtains offset $F_{offset}$ in carrier unit (hereafter referred to as a major unit offset). The obtained major unit offset Foffset is supplied to the local oscillation block 53 (FIG. 6). Consequently, center frequency $F_{NC}$ of a carrier generated in the local oscillation block 53 is changed to $F_{NC}+F_{offset}$. As a result, the frequency error of carrier unit of the carrier of the signal entered in the P1 decode processing unit 57 is corrected.

As described above, the correlator 71, the maximum searcher 72, the delay block 73, the carrier error correction block 74, the FFT computation block 75, and the CDS correlator 76 execute transmission path decode processing that is the processing of decoding transmission paths.

On the basis of the symbol start signal supplied from the CDS correlator 76, the decode block 77 executes decoding, DBPSK demodulation, and S1 signal and S2 signal extraction processing on the I component and the Q component of the signal having 384 pieces of data supplied from the CDS correlator 76. It should be noted that the decoding by the decode block 77 corresponds to the encryption processing to be executed by the scramble block 23 shown in FIG. 2, the DBPSK demodulation corresponds to the DBPSK modulation to be executed by the DBPSK modulation block 22 shown in FIG. 2, and the S1 signal and S2 signal extraction processing corresponds to the mapping to be executed by the 384-bit signal generation block 21 shown in FIG. 2.

In addition, the decode block 77 outputs the extracted S1 and S2 and an enable flag for enabling the reset of a register 113 (FIG. 11 to be described later) of the maximum searcher 72 to the register 113.

As described above, the decode block 77 executes information source decode processing that is the processing of decoding the information represented by signals.

Figure 8:
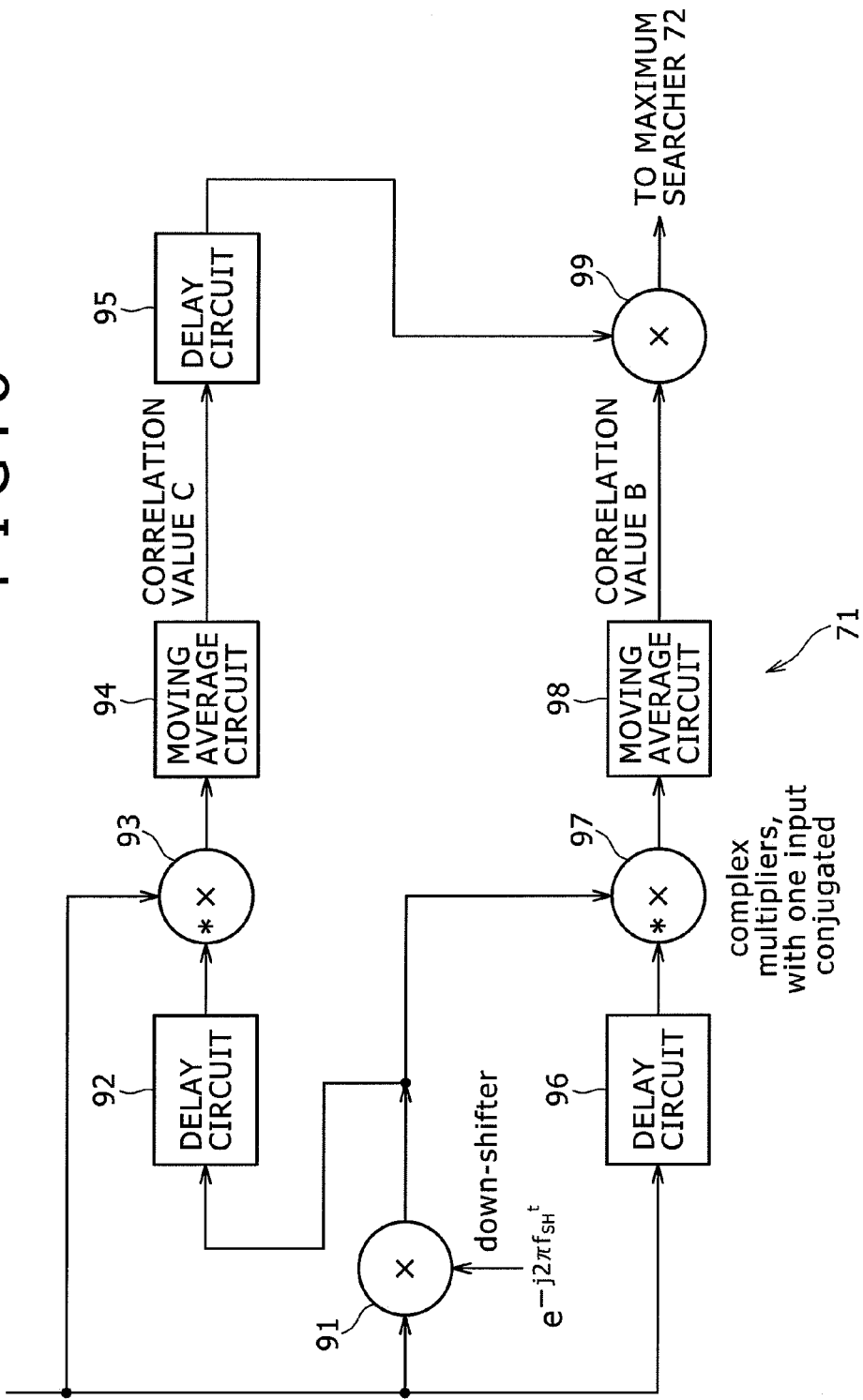
FIG. 8 is a block diagram illustrating a detail exemplary configuration of a correlator.

Explanation of the Correlator:

Referring to FIG. 8, there is shown a block diagram illustrating a detail exemplary configuration of the correlator 71.

It should be noted that FIG. 8 shows an exemplary configuration of a part by which a correlation value of I component is obtained in the correlator 71. A configuration of a part by which a correlation value of Q component in the correlator 71 is substantially the same as that shown in FIG. 8, so that the illustration thereof is skipped.

As shown in FIG. 8, the correlator 71 is composed of a frequency shifter 91, a delay circuit 92, a multiplier 93, a moving average circuit 94, a delay circuit 95, a delay circuit 96, a multiplier 97, a moving average circuit 98, and a multiplier 99.

The frequency shifter 91 multiplies the I component of a signal in a predetermined section supplied from the quadrature demodulation block 55 by $e^{(-j2\pi f_{SH}t)}$, thereby executing frequency conversion such that the frequency of that I component is lower by frequency $f_{SH}$. Consequently, if the signal supplied from the quadrature demodulation block 55 is a P1 signal, then the frequencies of duplicate part C and duplicate part B of this P1 signal become the same as the original frequency of actual information part A. The frequency shifter 91 supplies the I component lowered in frequency by frequency $f_{SH}$ to the delay circuit 92.

The delay circuit 92 delays the I component supplied from the frequency shifter 91 by length Tc of duplicate part C of the P1 signal and supplies the delayed signal to the multiplier 93.

In the multiplier 93, the I component of the signal obtained as a result of the quadrature demodulation from the quadrature demodulation block 55 is entered and, at the same time, the I component delayed by the delay circuit 92 is entered. The multiplier 93 multiplies the entered I components by each other and supplies a multiplication result to the moving average circuit 94. To be more specific, the multiplier 93 obtains a correlation values of the I component in a predetermined section of the signal obtained as a result of quadrature demodulation and the I component after frequency conversion in a section other than this predetermined section and supplies the obtained correlation values to the moving average circuit 94.

The moving average circuit 94 obtains a moving average value of the multiplication results supplied from the multiplier 93 and supplies the obtained moving average value to the delay circuit 95 as correlation value C.

The delay circuit 95 delays correlation value C supplied from the moving average circuit 94 such that correlation value C from the delay circuit 95 is entered in the multiplier 99 at the same time as correlation value B from the moving average circuit 98. The delay circuit 95 supplies correlation value C after delay to the multiplier 99.

The delay circuit 96 delays the I component of the signal in a predetermined section supplied from the quadrature demodulation block 55 by length Tb of duplicate part B of the P1 signal and supplies the delayed I component to the multiplier 97.

The multiplier 97 multiplies the I component supplied from the frequency shifter 91 by the I component supplied from the delay circuit 96 and supplies a multiplication result to the moving average circuit 98. To be more specific, the multiplier 97 obtains a correlation value of the I component of a predetermined section obtained as a result of quadrature demodulation and the I component of the signal after frequency conversion of a section other than this predetermined section and supplies the obtained correlation value to the moving average circuit 98.

The moving average circuit 98 obtains a moving average value of the multiplication result supplied from the multiplier 97 and supplies the obtained moving average value to the multiplier 99 as correlation value B.

The multiplier 99 multiplies correlation value C supplied from the delay circuit 95 by correlation value B supplied from the moving average circuit 98 and supplies a multiplication result to the maximum searcher 72 as the correlation value of I component.

Figure 9:
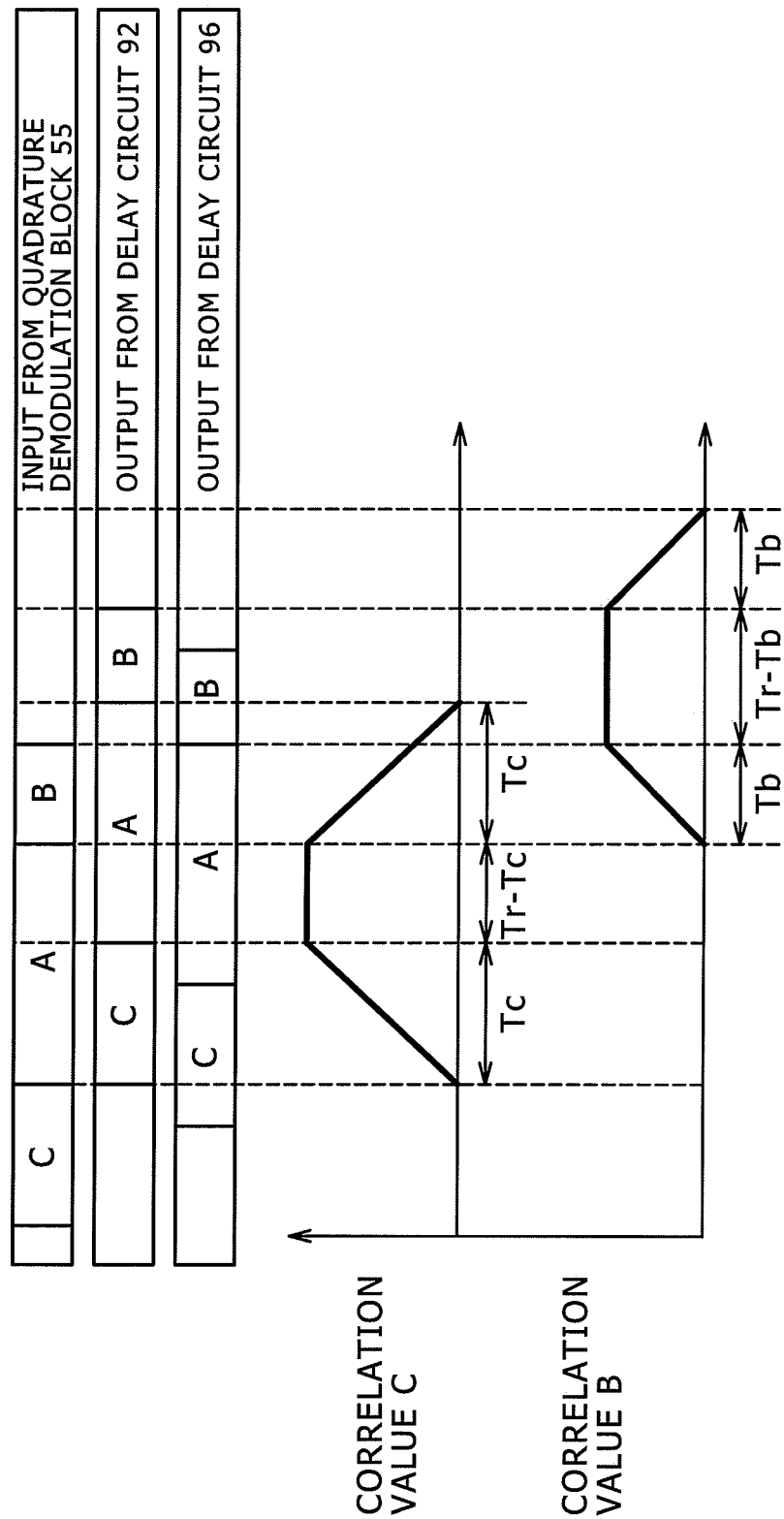
FIG. 9 is a diagram explaining correlation value B and correlation value C obtained before delay.
Figure 10:
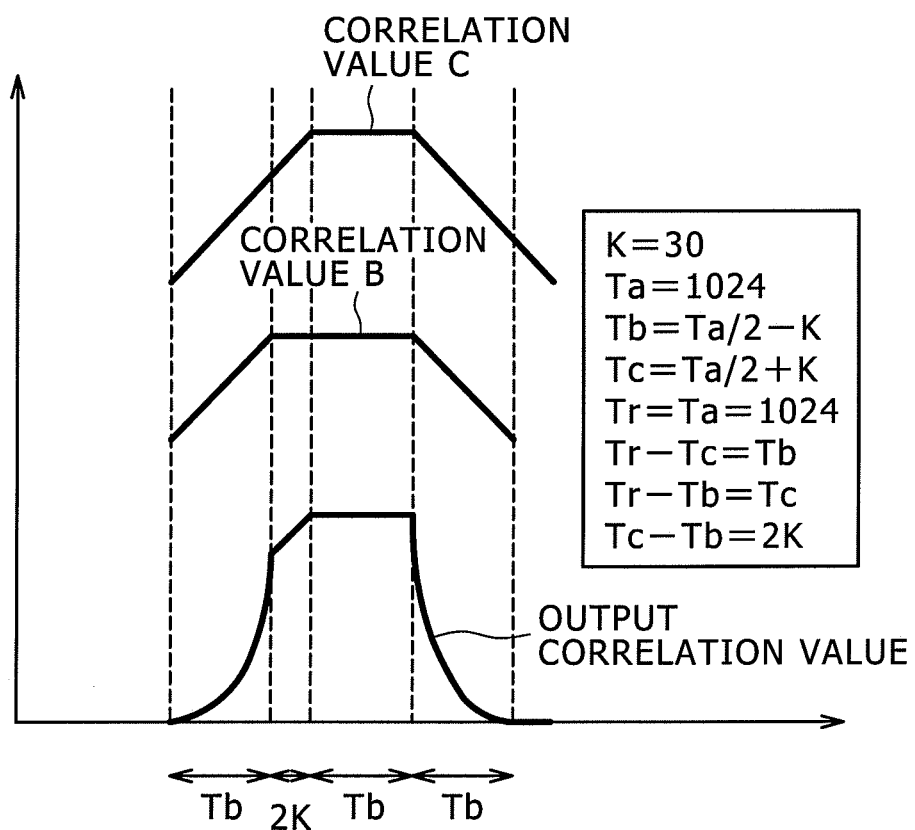
FIG. 10 is a diagram indicative of correlation value B, correlation value C, and output correlation value obtained after delay.

FIG. 9 explains correlation value B and correlation value C before delay if the signal entered from the quadrature demodulation block 55 is a P1 signal. FIG. 10 shows correlation value B and correlation value C after delay and an output correlation value in this case.

As shown in FIG. 9, if the signal entered from the quadrature demodulation block 55 is a P1 signal, the P1 signal outputted from the delay circuit 92 starts from the start time of actual information part A of the P1 signal entered from the quadrature demodulation block 55. Further, the frequency of duplicate part C and duplicate part B of the P1 signal outputted from the delay circuit 92 is substantially the same as the frequency of actual information part A of the P1 signal entered from the quadrature demodulation block 55.

The P1 signal outputted from the delay circuit 96 is a signal in which the terminal position of actual information part B of the P1 signal entered from the quadrature demodulation block 55 matches the start position of duplicate part B of the P1 signal outputted from the delay circuit 96.

As described above and as shown in FIG. 9, correlation value C increases with a predetermined inclination for a period of length Tc from the start position of actual information part A of the P1 signal entered from the quadrature demodulation block 55 and then goes constant for a period of length Tr–Tc, finally decreasing with predetermined inclination for a period of length Tc. It should be noted that length Tr denotes the length of actual information part A.

Further, as shown in FIG. 9, correlation value B increases with a predetermined inclination for a period of length Tb from the start position of duplicate part B of the P1 signal entered from the quadrature demodulation block 55 and then goes constant for a period of length Tr-Tb, finally decreasing with a predetermined inclination for a period of length Tb.

Correlation value C as described above is delayed by the delay circuit 95 to be substantially the same in increase start timing as correlation value B as shown in FIG. 10. Therefore, the correlation value outputted from the correlator 71 increases for a period of length Tb and then increases for 2K (=Tc−Tb) with a predetermined inclination as shown in FIG. 10. Then, the correlation value outputted from the correlator 71 goes constant for a period of length Tb and then decreases for a period of length Tb.

Figure 11:
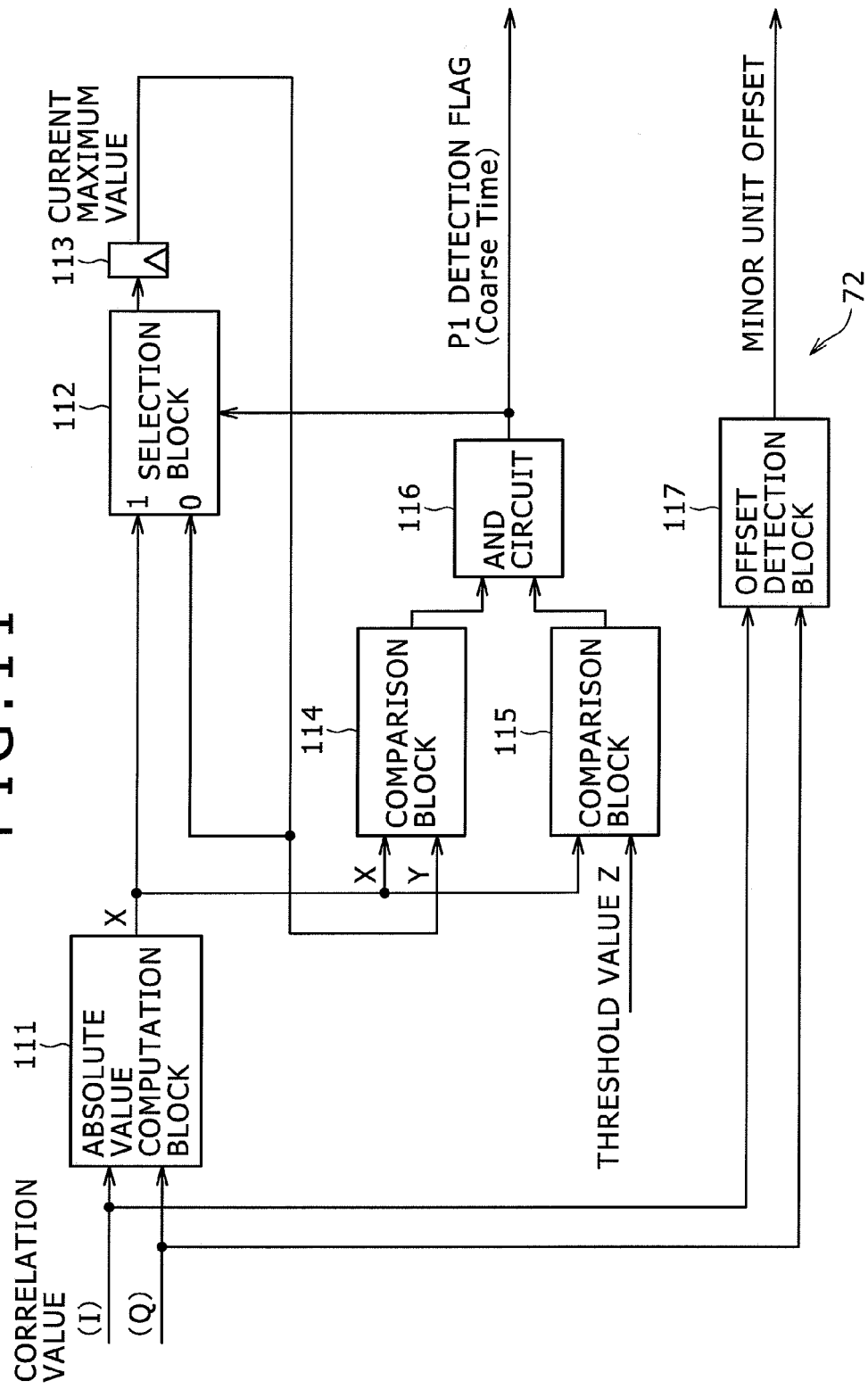
FIG. 11 is a block diagram illustrating a detail exemplary configuration of a maximum searcher.

Explanation of the Maximum Searcher:

Referring to FIG. 11, there is shown a block diagram illustrating a detail exemplary configuration of the maximum searcher 72.

As shown in FIG. 11, the maximum searcher 72 is composed of an absolute value computation block 111, a selection block 112, a register 113, comparison blocks 114 and 115, an AND circuit 116, and an offset detection block 117.

The absolute value computation block 111 obtains absolute value X of a vector represented by the correlation value of I component and Q component supplied from the correlator 71 and supplies the obtained absolute value X to the selection block 112 and the comparison blocks 114 and 115.

The selection block 112 selects one of absolute value X supplied from the absolute value computation block 111 and absolute value Y that is the largest at the current point of time of outputted from the register 113 on the basis of a P1 detection flag supplied from the AND circuit 116 and supplies the selected absolute value to the register 113.

The register 113 stores the absolute value supplied from the selection block 112 as absolute value Y that is the largest at the current point of time. In addition, the register 113 supplies the stored absolute value Y to the selection block 112 and the comparison block 114. Further, the register 113 resets the stored absolute value Y to 0 in accordance with an enable flag outputted from the decode block 77 (FIG. 7).

The comparison block 114 compares absolute value X supplied from the absolute value computation block 111 with absolute value Y that is the largest at the current point of time as a reference value supplied from the register 113 and supplies a comparison result to the AND circuit 116.

The comparison block 115 compares absolute value X supplied from the absolute value computation block 111 with threshold value Z entered from the outside and supplies a comparison result to the AND circuit 116. Threshold value Z is held in advance in a memory, not shown, incorporated in the P1 decode processing unit 57, for example.

If the comparison result supplied from the comparison block 114 indicates that absolute value X is higher than absolute value Y that is the largest at the current point of time and the comparison result supplied from the comparison block 115 indicates that absolute value X is higher than threshold value Z, then the AND circuit 116 outputs an H-level signal indicative of the detection of the P1 signal as a P1 detection flag. Namely, if absolute value X is the absolute value that is the largest at the current point of time and absolute value X is higher than threshold value Z, the AND circuit 116 outputs an H-level signal as a P1 detection flag.

On the other hand, if the comparison results are other than those mentioned above, the AND circuit 116 outputs an L-level signal indicative of non-detection of the P1 signal as a P1 detection flag.

The offset detection block 117 obtains a minor unit offset by use of a phase indicated by the correlation value of I component and the correlation value of Q component supplied from the correlator 71 and supplies the obtained minor unit offset to the carrier error correction block 74 (FIG. 7).

Figures 12A, 12B:
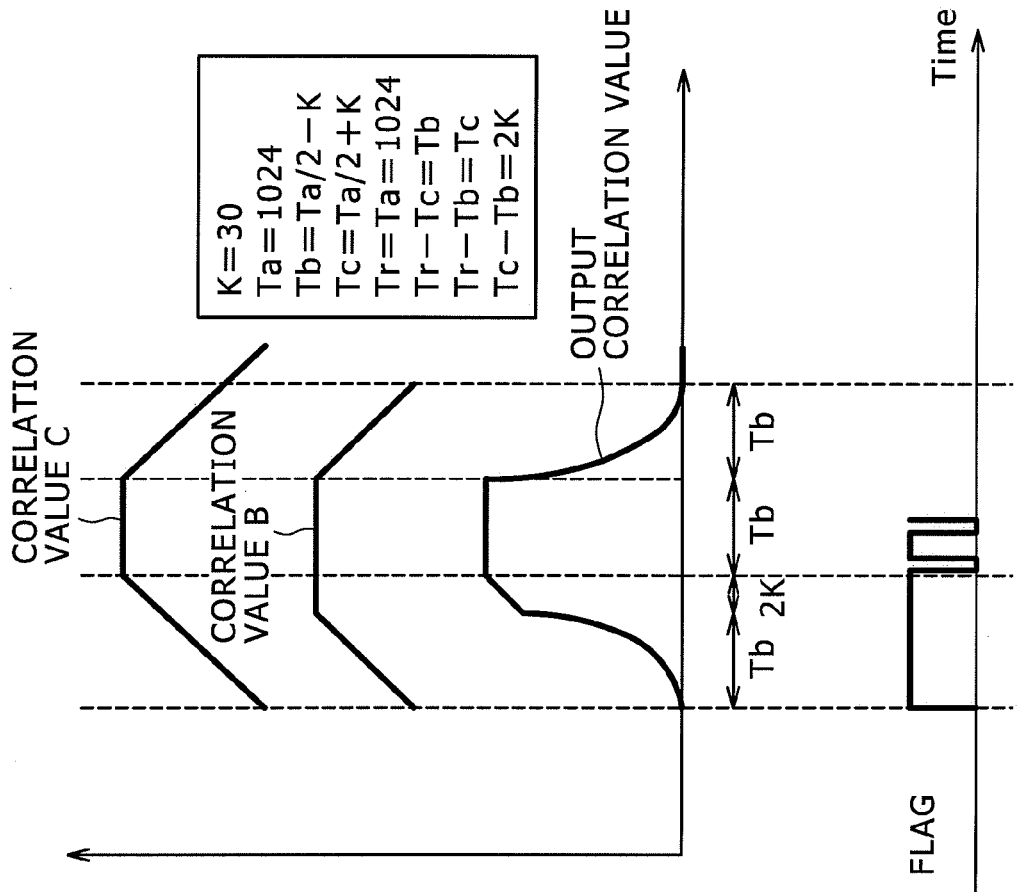
FIGS. 12A and 12B are diagrams illustrating a P1 detection flag.

FIGS. 12A and 12B explain the P1 detection flag.

In the example shown in FIGS. 12A and 12B, as shown in FIG. 12A, the correlation value of I component and the correlation value of Q component outputted from the correlator 71 are each substantially the same as the correlation value of I component described with reference to FIG. 10. To be more specific, the correlation value of I component and the correlation value of Q component outputted from the correlator 71 each increase for a period of length Tb, and then increase for 2K with a predetermined inclination and go constant for a period of length Tb, finally decreasing for a period of length Tb.

In the above-mentioned case, for a period of length Tb+2K from the start of increase of the correlation value of I component and the correlation value of Q component outputted from the correlator 71, the correlation value of I component and the correlation value of Q component increase, so that, as shown in FIG. 12B, the P1 detection flag goes H level. Subsequently, for a period of length Tb, the correlation value of I component and the correlation value of Q component go constant; however, under the influence of noise, for example, the P1 detection flag goes H level or L level. Then, for a next period of length Tb, the correlation value of I component and the correlation value of Q component decrease, making the P1 detection flag go L level.

Flow of Processing to be executed by the P1 Decode Processing Unit:

Now, referring to FIGS. 13A to 13E, there is shown a timing chart indicative of a flow of the processing to be executed by the P1 decode processing unit 57 shown in FIG. 7.

As shown in FIG. 13A, a signal of i-th I component outputted from the delay block 73 to the carrier error correction block 74 is represented as Ii and a signal of Q component is represented as Qi.

If a P1 detection flag supplied from the maximum searcher 72 is H level, the carrier error correction block 74 generates signal P indicative of a phase for correction of the frequency error of the carrier of a signal entered from the delay block 73 by use of minor unit offset F supplied from the maximum searcher 72 along with the P1 detection flag. On the other hand, if the P1 detection flag supplied from the maximum searcher 72 is L level, the carrier error correction block 74 generates signal P by use of minor unit offset F supplied from the maximum searcher 72 along with the immediately preceding P1 detection flag of H level.

To be more specific, in the example shown in FIGS. 13A to 13E, as shown in FIG. 13B, the P1 detection flag outputted from the maximum searcher 72 goes H level for the third through fifth signals, the seventh signal, the ninth signal, the tenth signal, and the twelfth signal and goes L level for the other signals.

Therefore, for example, the carrier error correction block 74 generates signals P3 through P5 for indicative of phases corresponding to minor unit offsets F3 through F5 for the third through fifth signals. In addition, the carrier error correction block 74 generates signal P6 by use of minor unit offset F5 for the fifth signal corresponding to the immediately preceding P1 detection flag of H level for the sixth signal supplied from the delay block 73. Namely, signal P6 is substantially the same as signal P5.

On the basis of the signal P generated as described above, the carrier error correction block 74 corrects a frequency error of the carrier of the signal entered from the delay block 73 and supplies the corrected signal to the FFT computation block 75.

If the P1 detection flag supplied from the maximum searcher 72 is at H level, the FFT computation block 75 designate the signal supplied from the carrier error correction block 74 to be signal 0. Then, when the P1 detection flag goes L level, the FFT computation block 75 designates the signal supplied from the carrier error correction block 74 to be the first signal. Subsequently, if the P1 detection flag remains at L level, the signals supplied from the carrier error correction block 74 are designated the second signal and on. On the other hand, if the P1 detection flag goes H level until the number reaches 1023, the number is reset to 0.

To be more specific, as shown in FIG. 13E, if the third signal is supplied from the carrier error correction block 74, the P1 detection flag is at H level, so that the FFT computation block 75 designates this signal as signal 0. Then, if the fourth and fifth signals are supplied from the carrier error correction block 74, the P1 detection flag is also at H level, so that the FFT computation block 75 designates this signal as signal 0.

Next, if the sixth signal is supplied from the carrier error correction block 74, the P1 detection flag is at L level, so that the FFT computation block 75 designates this signal as the first signal. Then, if the seventh signal is supplied from the carrier error correction block 74, the P1 detection flag is at H level, the FFT computation block 75 designates this signal as signal 0 again.

Then, if the eighth signal is supplied from the carrier error correction block 74, the P1 detection flag is at L level, so that the FFT computation block 75 designates this signal as the first signal. Next, if the ninth signal is supplied from the carrier error correction block 74, the P1 detection flag is at H level, so that the FFT computation block 75 designates this signal as the signal 0. Then, if the tenth signal is supplied from the carrier error correction block 74, the P1 detection flag is at H level, so that the FFT computation block 75 designates this signal as the signal 0 again.

Next, if the eleventh signal is supplied from the carrier error correction block 74, the P1 detection flag is at L level, so that the FFT computation block 75 designates this signal as the first signal. Then, if the twelfth signal is supplied from the carrier error correction block 74, the P1 detection flag is at H level, so that the FFT computation block 75 designates this signal as the signal 0 again.

Then, if the thirteenth signal is supplied from the carrier error correction block 74, the P1 detection flag is at L level, so that the FFT computation block 75 designates this signal as the first signal. Next, if the fourteenth signal is supplied from the carrier error correction block 74, the P1 detection flag is at L level, so that the FFT computation block 75 designates this signal as the second signal. Subsequently, the P1 detection flag is at L level, the FFT computation block 75 increases the numbers of signals supplied from the carrier error correction block 74.

When the number has reached 1023, the FFT computation block 75 executes FFT computation on the signals supplied from the carrier error correction block 74 and allocated with numbers 0 through 1023 to obtain signals of 1024 pieces of data. As described above, the FFT computation block 75 executes FFT computation by use of P1 detection flags with the rear thereof prioritized.

Figure 14:
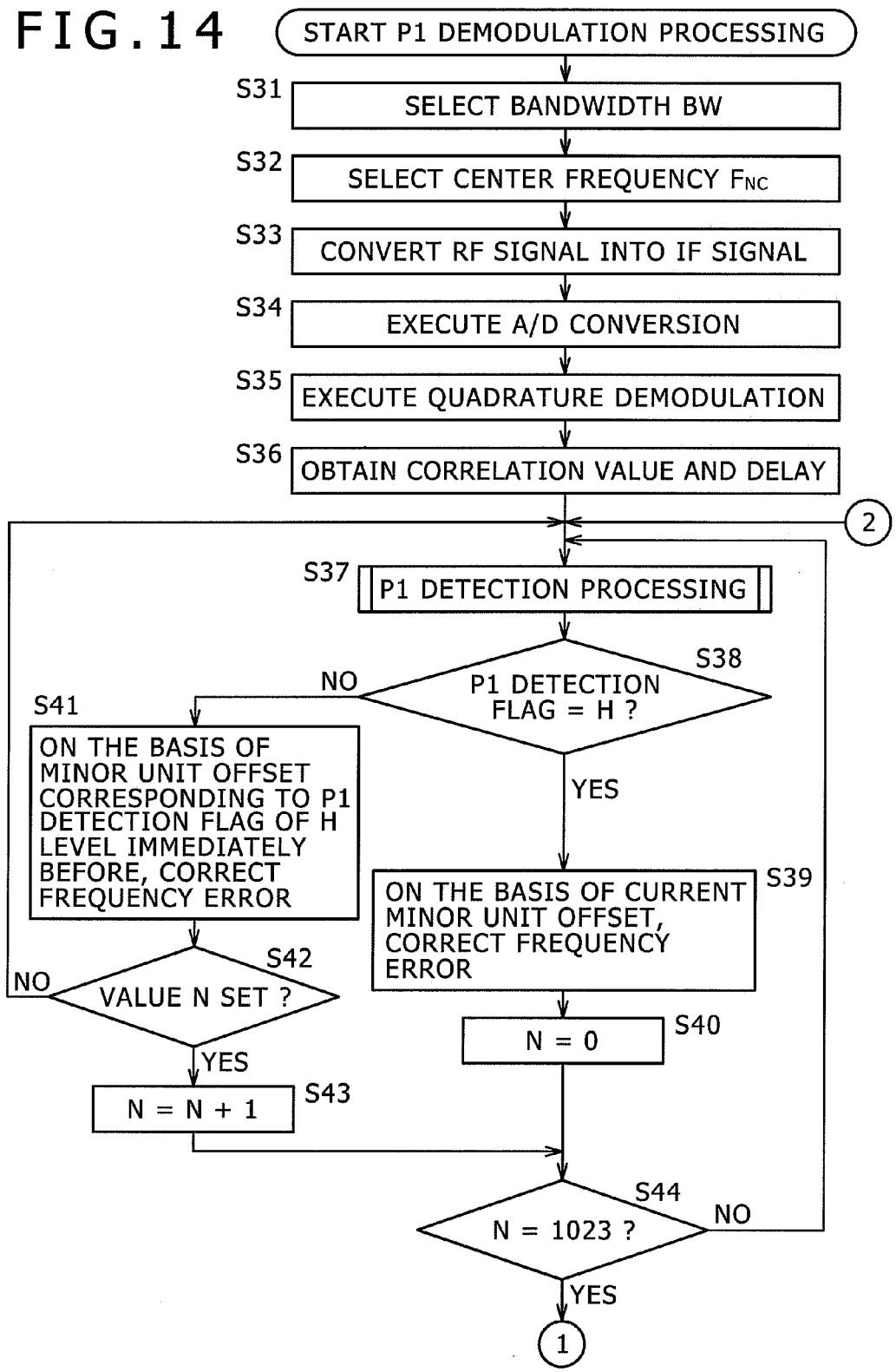
FIG. 14 is a flowchart indicative of P1 demodulation processing to be executed by a receiving system.
Figure 15:
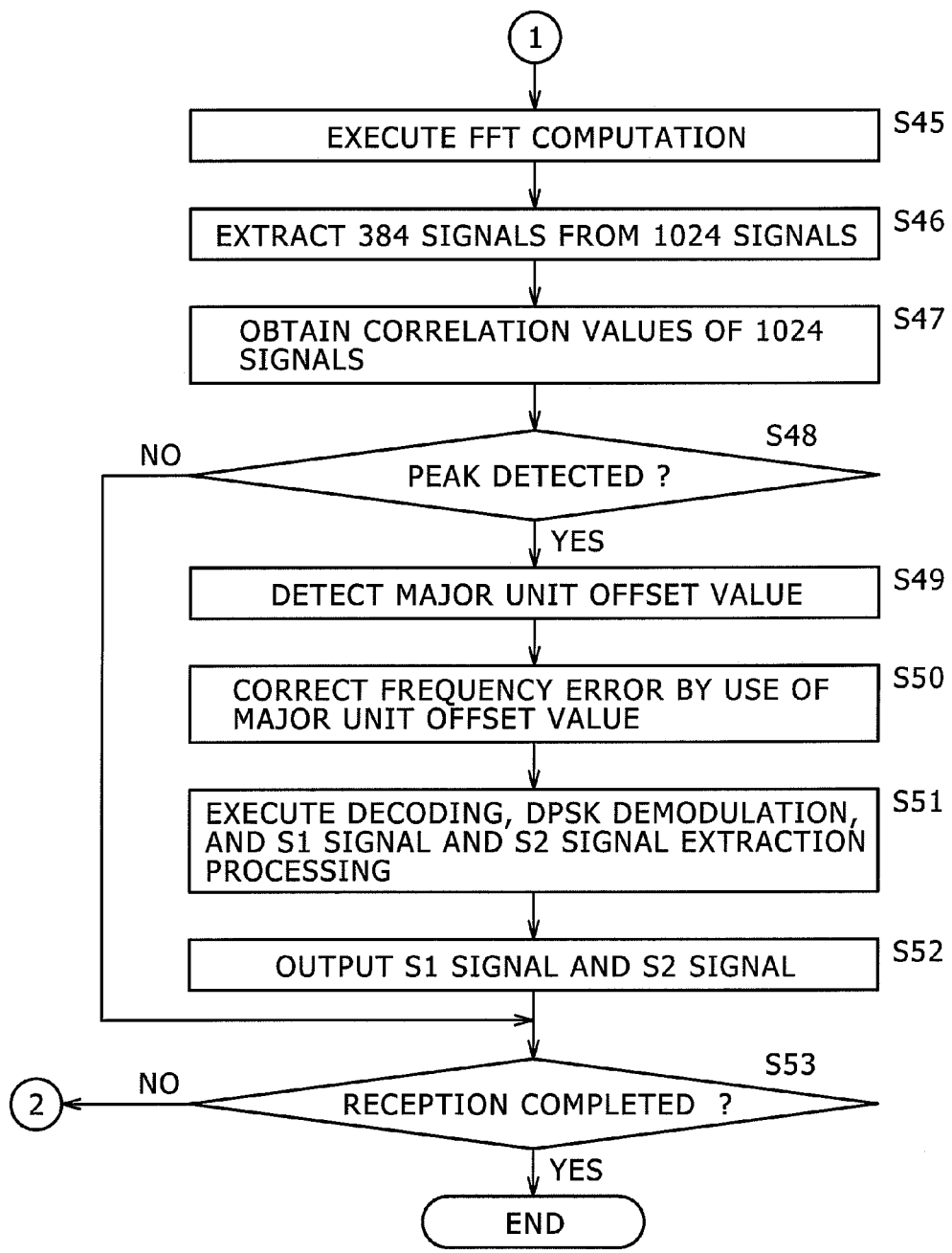
FIG. 15 is a flowchart indicative of P1 demodulation processing to be executed by a receiving system.

Explanation of Processing to be Executed by a Receiving System:

FIG. 14 and FIG. 15 are flowcharts indicative of P1 demodulation processing to be executed by the receiving apparatus 50.

In step S31, the local oscillation blocks 53 and 56 shown in FIG. 6 select bandwidth BW. In step S32, the local oscillation block 53 selects center frequency $F_{NC}$. In step S33, the frequency conversion block 52 multiplies an RF signal received by the antenna 51 by a carrier wave having an oscillation frequency ($F_{NC}$+BW) supplied from the local oscillation block 53 to convert the RF signal into an IF signal having center frequency $F_{NC}$. The frequency conversion block 52 supplies this IF signal to the A/D conversion block 54.

In step S34, the A/D conversion block 54 executes A/D conversion on the IF signal supplied from the frequency conversion block 52 and supplies a resultant digitized IF signal to the quadrature demodulation block 55.

In step S35, the quadrature demodulation block 55 executes quadrature demodulation on the IF signal supplied from the A/D conversion block 54 by use of the carrier wave supplied from the local oscillation block 56. The quadrature demodulation block 55 supplies a signal composed of I component and Q component obtained as a result of the quadrature demodulation to the P1 decode processing unit 57 and the data decode processing block 58.

In step S36, the correlator 71 (FIG. 7) of the P1 decode processing unit 57 obtains correlation values of the I component and the Q component of the signal supplied from the quadrature demodulation block 55 and supplies the obtained correlation values to the maximum searcher 72. In addition, the delay block 73 delays the correlation values of the I component and the Q component of the signal supplied from the quadrature demodulation block 55 by a predetermined time and supplies the resultant correlation values to the carrier error correction block 74.

In step S37, the maximum searcher 72 executes P1 detection processing for the detection of a P1 signal. Details of this P1 detection processing will be described later with reference to FIG. 16.

In step S38, the FFT computation block 75 determines whether the P1 detection flag supplied from the maximum searcher 72 by the P1 detection processing in step S37 is at H level or not. If the P1 detection flag is found at H level in step S38, then the carrier error correction block 74 corrects the frequency error of the carrier of the signal supplied from the delay block 73 on the basis of a minor unit offset for the current signal supplied from the maximum searcher 72 and supplies the corrected signal to the FFT computation block 75 in step S39.

In step S40, the FFT computation block 75 sets value N allocated to the signal supplied from the carrier error correction block 74 to 0. Namely, the FFT computation block 75 resets the FFT computation processing. Then, the procedure goes to step S44.

If the P1 detection flag is found at L level in step S38, then the carrier error correction block 74 corrects the frequency error of the carrier of the signal supplied from the delay block 73 on the basis of a minor unit offset for the signal corresponding to the immediately preceding P1 detection flag of H level and supplies the corrected signal to the FFT computation block 75 in step S41.

In step S42, the FFT computation block 75 determines whether value N has been set or not. If value N is found not yet set, the procedure returns to steps S37. Then, the processing operations of step S37, step S38, and step S42 are repeated until the P1 detection flag goes H level.

If value N is found set in step S42, then the FFT computation block 75 increments N by 1 in step S43, upon which the procedure goes to step S44.

In step S44, the FFT computation block 75 determines whether value N is 1023 or not. If value N is found not to be 1023 in step S44, then the procedure returns to step S37 to repeat the processing operations of steps S37 through S43 until value N reaches 1023.

As described above, if the P1 detection flag goes H until value N reaches 1023, the FFT computation block 75 resets the FFT computation processing. Therefore, even in a situation where the P1 signal is transmitted in a multipath environment having a pre-echo, the FFT computation can be executed on the main wave of the P1 signal.

If value N is found to be 1023 in step S44, then the FFT computation block 75 executes FFT computation on the I component and the Q component of the signals allocated with numbers 0 through 1023 and supplies the I component and the Q component of the signal having 1024 pieces of data to the CDS correlator 76 in step S45 shown in FIG. 15. In addition, the FFT computation block 75 supplies a symbol start signal to the CDS correlator 76 at the start of outputting of the FFT computation result.

In step S46, the CDS correlator 76 references valid carrier numbers stored in an incorporated memory to extract the signal having 384 pieces of data from signal having 1024 pieces of data supplied from the FFT computation block 75. The CDS correlator 76 supplies the symbol start signal and the signal having 384 pieces of data to the decode block 77.

In step S47, the CDS correlator 76 obtains correlation values of the I component and the Q component of the signal having 1024 pieces of data supplied from the FFT computation block 75.

In step S48, the CDS correlator 76 determines whether a peak of the correlated value has been detected or not. If the peak of the correlated value is found detected, then the procedure goes to step S49.

In step S49, the CDS correlator 76 detects major unit offset $F_{offset}$ on the basis of the detected peak of the correlation value and supplies the detected offset to the local oscillation block 53.

In step S50, the local oscillation block 53 changes center frequency $F_{NC}$ to $F_{NC}+F_{offset}$ by use of major unit offset $F_{offset}$ to correct the frequency error of the carrier of the signal to be entered in the P1 decode processing unit 57.

In step S51, the decode block 77 executes decoding, DBPSK demodulation, and S1 signal and S2 signal extraction on the I component and the Q component of the signal having 384 pieces of data supplied from the CDS correlator 76.

In step S52, the decode block 77 outputs the S1 signal and the S2 signal and, at the same time, outputs an enable flag. In response to this enable flag, the value of the register 113 (FIG. 11) of the maximum searcher 72 is reset to 0. Then, the procedure goes to step S53.

On the other hand, if the peak of the correlation value is found not detected in step S48, then the procedure goes to step S53.

In step S53, the maximum searcher 72 determines whether the reception by the antenna 51 has ended, namely, inputting of the correlation values of the I component and the Q component from the correlator 71 has ended or not. If the reception by the antenna 51 is found not ended in step S53, then the procedure returns to step S37 shown in FIG. 14 to repeat the processing operations of steps S37 through S53 until the reception by the antenna 51 ends.

On the other hand, if the reception by the antenna 51 is found ended in step S53, then the processing comes to an end.

Figure 16:
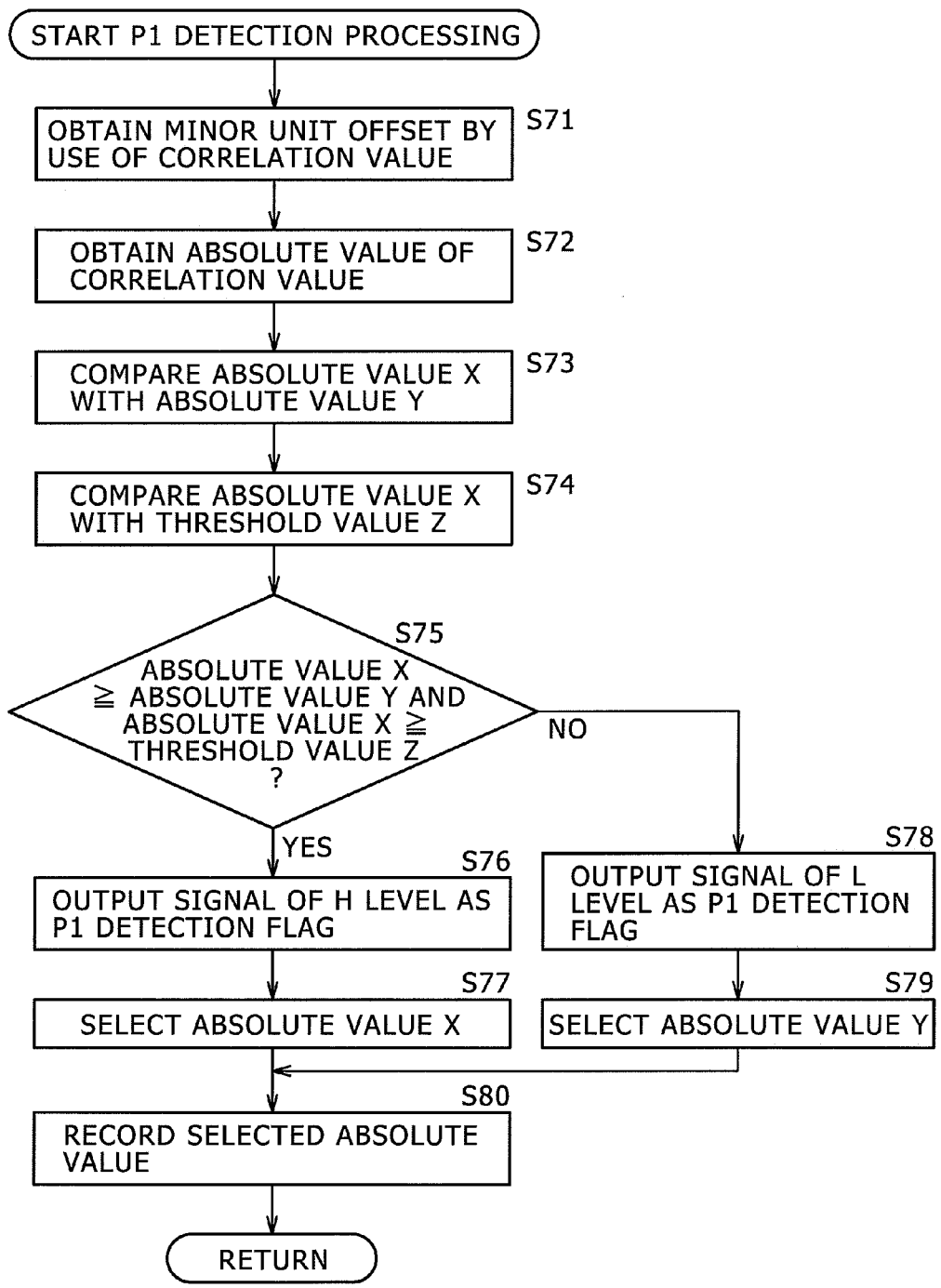
FIG. 16 is a flowchart indicative of P1 detection processing executed in step S37 shown in FIG. 14.

FIG. 16 is a flowchart indicative of P1 detection processing of step S37 shown in FIG. 14.

In step S71, the offset detection block 117 (FIG. 11) of the maximum searcher 72 obtains a minor unit offset by use of the phase indicated by the correlation values of the I component and the Q component supplied from the correlator 71 and supplies the obtained minor unit offset to the carrier error correction block 74.

In step S72, the absolute value computation block 111 obtains absolute value X of a vector indicated by the correlation values of the I component and the Q component supplied from the correlator 71 and supplies the obtained absolute value X to the selection block 112 and the comparison blocks 114 and 115.

In step S73, the comparison block 114 compares absolute value X supplied from the absolute value computation block 111 with absolute value Y that is the largest at the current point of time supplied from the register 113 and supplies a comparison result to the AND circuit 116.

In step S74, the comparison block 115 compares absolute value X supplied from the absolute value computation block 111 with threshold value Z entered from the outside and supplies a comparison result to the AND circuit 116.

In step S75, the AND circuit 116 determines on the basis of the comparison result supplied from the comparison blocks 114 and 115 whether absolute value X is higher than absolute value Y that is the largest at the current point of time and absolute value X is higher than threshold value Z.

If absolute value X is found higher than absolute value Y that is the largest at the current point of time and absolute value X is higher than threshold value Z in step S75, then the AND circuit 116 outputs a signal of H level as a P1 detection flag in step S76.

In step S77, the selection block 112 selects absolute value X supplied from the absolute value computation block 111 and supplies the selected absolute value X to the register 113, upon which the procedure goes to step S80.

On the other hand, if absolute value X is found not higher than absolute value Y that is the largest at the current point of time or absolute value X is found not higher than threshold value Z, then the AND circuit 116 outputs a signal of L level as a P1 detection flag in step S78.

In step S79, the selection block 112 selects absolute value Y that is the largest at the current point of time supplied from the register 113 and supplies the selected absolute value Y to the register 113, upon which the procedure goes to step S80.

In step S80, the register 113 stores the absolute value supplied from the selection block 112 as absolute value Y that is the largest at the current point of time. This absolute value Y is supplied to the selection block 112 and the comparison block 114. After step S80, the procedure returns to step S37 shown in FIG. 14 to repeat the processing operations of steps S38 and on.

As described above, the receiving apparatus 50 computes the correlation values of I component and Q component of each DVB-T2 signal, detects a maximum value at the current point of time of the absolute value of a vector indicated by the correlation values of I component and Q component, and, every time the maximum value is detected, resets the FFT computation processing executed by use of the I component and the Q component of the DVB-T2 signal, so that the receiving apparatus 50 is able to detect a P1 signal with a position at which the correlation value is maximized in the DVB-T2 signal being the P1 signal detection position and decode the detected P1 signal.

Figure 17:
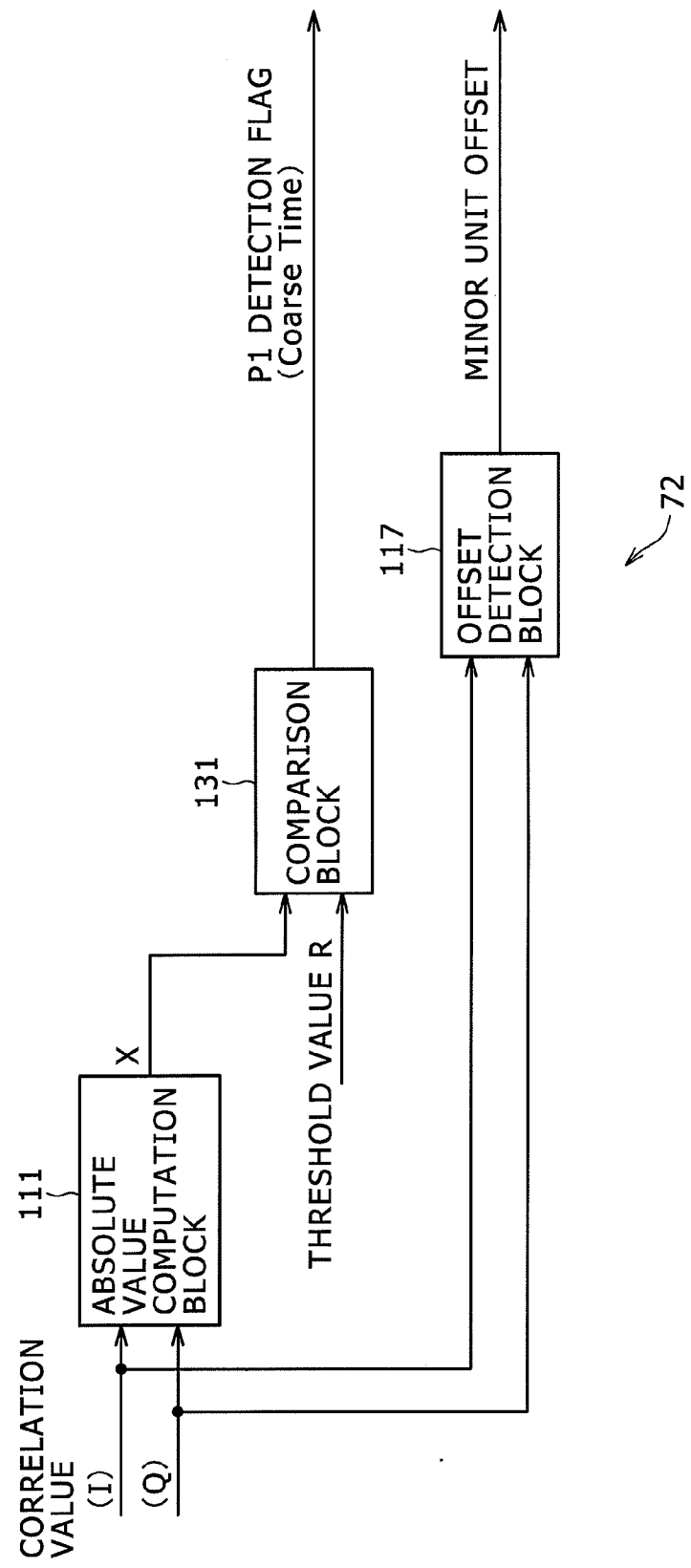
FIG. 17 is a block diagram illustrating another detail exemplary configuration of a maximum correlator.

Another Detail Exemplary Configuration of the Maximum Searcher:

Referring to FIG. 17, there is shown a block diagram illustrating another detail exemplary configuration of the maximum searcher 72.

With reference to FIG. 17, components previously described with reference to FIG. 11 are denoted by the same reference numerals and the duplicate description will be skipped appropriately.

The configuration of the maximum searcher 72 shown in FIG. 17 is different from that shown in FIG. 11 mainly in that the selection block 112, the register 113, the comparison block 114, and the AND circuit 116 are not arranged and a comparison block 131 is arranged instead of the comparison block 115.

The comparison block 131 compares absolute value X supplied from the absolute value computation block 111 with threshold value R that provides a reference value. If absolute value X is found higher than threshold value R, the comparison block 131 determines absolute value X to be the maximum value at the current point of time, outputting a signal of H level as a P1 detection flag. On the other hand, if absolute value X is found lower than threshold value R, the comparison block 131 determines that absolute value X is not the maximum value at the current point of time, outputting a signal of L level as a P1 detection flag.

If the configuration of the maximum searcher 72 is that shown in FIG. 17, the configuration and the processing can be simplified as compared with the configuration shown in FIG. 11.

The Second Embodiment

Figure 18:
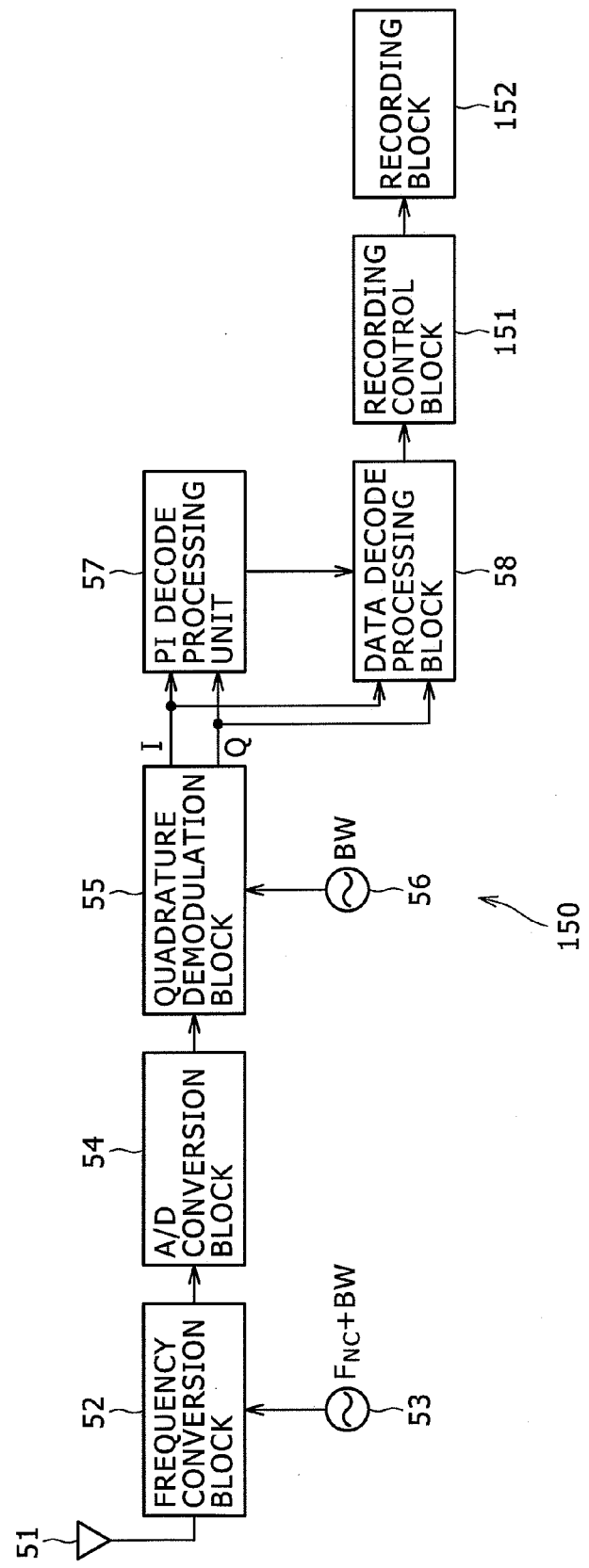
FIG. 18 is a block diagram illustrating an exemplary configuration of a receiving system practiced as a second embodiment of the invention.

Exemplary Configuration of a Receiving System Practiced as the Second Embodiment:

Now, referring to FIG. 18, there is shown a block diagram illustrating a receiving system practiced as the second embodiment of the present invention.

With reference to FIG. 18, components previously described with reference to FIG. 6 are denoted by the same reference numerals and the duplicate description will be skipped appropriately.

The configuration of a receiving system 150 shown in FIG. 18 is mainly different from that shown in FIG. 6 in that a recording control block 151 and a recording block 152 are arranged instead of the output block 59. The receiving system 150 records data signal without outputting the image and audio data corresponding to data signal.

To be more specific, the 151 records data signals outputted from a data decode processing block 58 to a recording block 152. The recording block 152 is based on a removable medium, such as a magnetic disk, an optical disk, a magneto-optical disk, or a semiconductor memory.

It should be noted that the broadcast signal may be a broadcast signal of IP-TV broadcasting. In this case, the transmission system 10 and the receiving apparatus 50 (150) have a network interface for the transmission and reception of DVB-T2 signals and the Internet for a transmission path. Further, the broadcast signal may be a broadcast signal of CATV broadcasting. In this case, the transmission system 10 and the receiving apparatus 50 (150) have terminals to which a cable for transmission and reception of DVB-T2 signals is connected and cables for a transmission path.

The above-mentioned sequence of processing operations may be executed by software as well as hardware.

Figure 19:
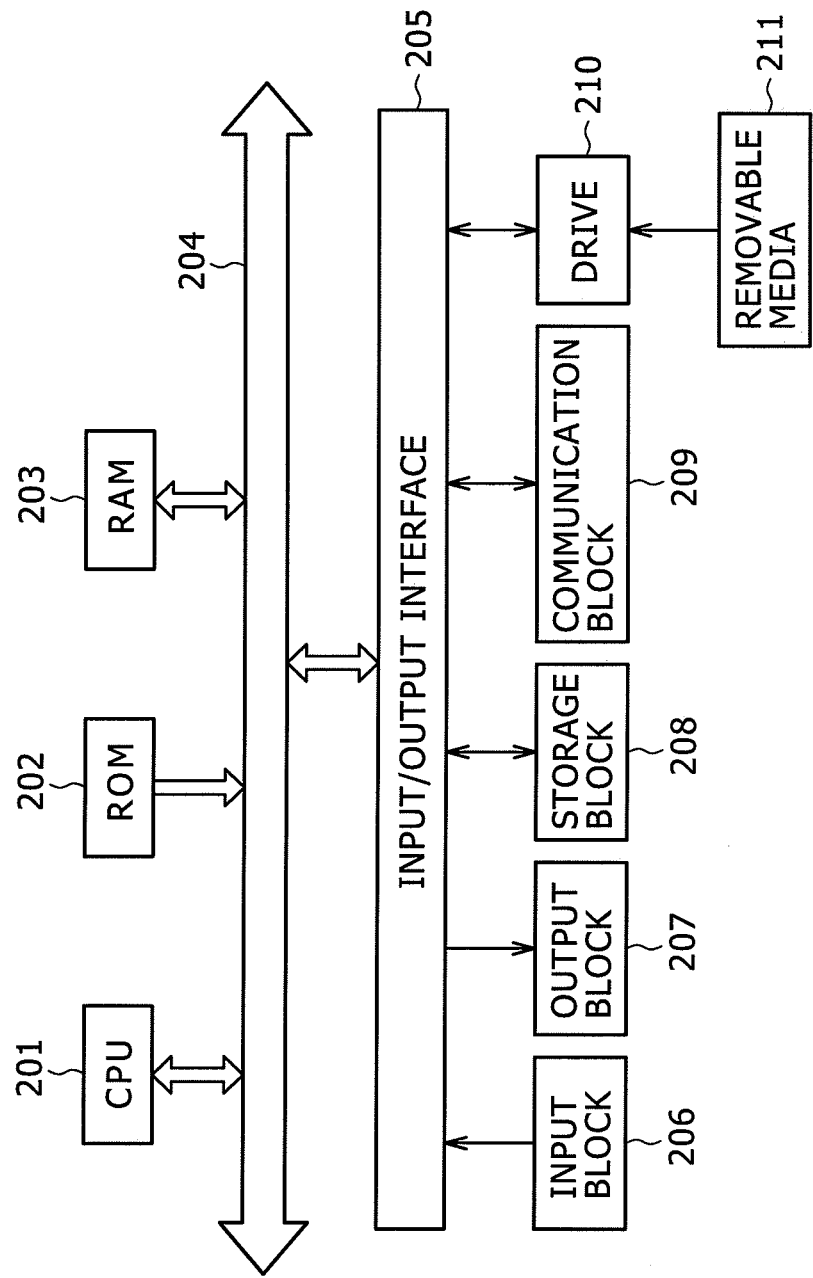
FIG. 19 is a block diagram illustrating an exemplary configuration of a personal computer.

In the above-mentioned case, a personal computer shown in FIG. 19 for example may be used for at least as a part of the above-mentioned receiving system.

In FIG. 19, a CPU (Central Processing Unit) 201 executes various processing operations as instructed by programs stored in a ROM (Read Only Memory) 202 or loaded from a storage block 208 into a RAM (Random Access Memory) 203. The RAM 203 also stores, from time to time, data necessary for the CPU 201 to execute various processing operations.

The CPU 201, the ROM 202, and the RAM 203 are interconnected via a bus 204. This bus 204 is also connected with an input/output interface 205.

The input/output interface 205 is connected with an input block 206 based on a keyboard and a mouse for example, an output block 207 based on a display monitor for example, the storage block 208 based on a hard disk drive for example, and a communication block 209 based on a modem and a terminal adaptor for example. The communication block 209 controls communication that is executed between the above-mentioned systems and external devices, not shown, via a network including the Internet.

The input/output interface 205 is further connected with a drive 210 as required. On this drive 210, removable media 211, such as a magnetic disk, an optical disk, a magneto-optical disk, or a semiconductor memory, is loaded from time to time, from which computer programs are read into the storage block 208 as required.

When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

As shown in FIG. 19, these recording media are constituted by not only the removable media 211 made up of the magnetic disk (including flexible disks), the optical disk (including CD-ROM (Compact Disk Read Only Memory), DVD (Digital Versatile Disk) and Blu-ray Disc), the magneto-optical disk (including MD (Mini Disk) (trademark)), or the semiconductor memory which are distributed to provide a program to users separately from the apparatus itself, but also the ROM 202 or the storage unit 208 which stores programs and is provided to users as incorporated in the apparatus itself.

It should be noted herein that the steps for describing each program recorded in recording media include not only the processing operations which are sequentially executed in a time-dependent manner but also the processing operations which are executed concurrently or discretely.

While preferred embodiments of the present invention have been described using specific terms, such description is for illustrative purpose only, and it is to be understood that changes and variations may be made without departing from the spirit or scope of the following claims.

The present application contains subject matter related to that disclosed in Japanese Priority Patent Application JP 2009-134956 filed in the Japan Patent Office on Jun. 4, 2009, the entire content of which is hereby incorporated by reference.

What is claimed is:

1. A receiving apparatus comprising:
   circuitry configured to:
   for a digital signal, transmitted on a frame basis, having a correlation between a first section and a second section occupying predetermined intervals at a start part of each frame, extract signals in two sections of a frame separated by time intervals of said first section and said second section and compute correlation values;
   detect every maximum value of said correlation values;
   execute Fast Fourier Transform processing on said digital signal on the basis of a timing every time a maximum value has been detected; and
   reset the Fast Fourier Transform processing every time said maximum value is detected, wherein
   in the frame, a frequency of the digital signal in said first section is different from a frequency of the digital signal in said second section, and
   said circuitry is further configured to compute the correlation values by converting the frequency of said digital signal of one of said two sections of the frame into a frequency of at least one of said first section and said second section and computing correlation values of said digital signal in the frequency-converted section and said digital signal of the section not frequency-converted;
   compare an absolute value of the correlation values with a reference value and, if said absolute value is found higher than said reference value, detect said absolute value as said maximum value, wherein
   said reference value is said maximum value detected last;
   store said maximum value;
   execute processing on a digital signal in a start part of said frame on the basis of said timing;
   reset said maximum value after the processing on said start part has ended without detection of new one of said maximum value from starting of the processing; and
   reset said maximum value after the processing on said digital signal of a predetermined number of pieces of data without detection of new one of said maximum value.

2. The receiving apparatus according to claim 1, wherein the circuitry is further configured to output an enable signal for enabling the reset of said storage after at least the processing for said start part has ended without detection of new one of said maximum value from starting of the processing, and
said storage resets said maximum value in response to said enable signal.

3. The receiving apparatus according to claim 1, wherein the processing is processing for executing Fast Fourier Transform computation on said digital signal of the start part of said frame.

4. The receiving apparatus according to claim 3, wherein the circuitry is further configured to:
   correct a frequency error of a carrier of said digital signal of the start part of said frame on the basis of a peak of correlation values of digital signals obtained as a result of said Fast Fourier Transform computation.

5. The receiving apparatus according to claim 1, wherein said digital signal of the start part of said frame is a P1 signal based on the DVB-T2 standard.

6. A receiving method comprising the steps of:
   for a digital signal, transmitted on a frame basis, having a correlation between a first section and a second section occupying predetermined intervals at a start part of each frame, extracting signals in two sections of a frame separated by time intervals of said first section and said second section and computing correlation values;
   detecting every maximum value of said correlation values;
   executing Fast Fourier Transform processing on said digital signal on the basis of a timing every time a maximum value has been detected by said maximum value detection step;
   resetting the Fast Fourier Transform processing in said digital signal processing step every time said maximum value is detected, wherein
   in the frame, a frequency of the digital signal in said first section is different from a frequency of the digital signal in said second section, and
   computing correlation values includes converting the frequency of said digital signal of one of said two sections of the frame into a frequency of at least one of said first section and said second section and computing correlation values of said digital signal in the frequency-converted section and said digital signal of the section not frequency-converted;
   comparing an absolute value of the correlation values with a reference value and, if said absolute value is found higher than said reference value, detect said absolute value as said maximum value, wherein
said reference value is said maximum value detected last; storing said maximum value;
executing processing on a digital signal in a start part of said frame on the basis of said timing;
resetting said maximum value after the processing on said start part has ended without detection of new one of said maximum value from starting of the processing; and
resetting said maximum value after the processing on said digital signal of a predetermined number of pieces of data without detection of new one of said maximum value.

7. A non-transitory medium storing a program configured to make a computer for executing processing on a digital signal, transmitted on a frame basis, having a correlation between a first section and a second section occupying a predetermined interval in a start part of each frame execute the steps of:
extracting signals in two sections of a frame separated by time intervals of said first section and said second section and computing correlation values;
detecting every maximum value of said correlation values;
executing Fast Fourier Transform processing on said digital signal on the basis of a timing every time a maximum value has been detected by said maximum value detection step;
resetting the Fast Fourier Transform processing in said digital signal processing step every time said maximum value is detected, wherein
in the frame, a frequency of the digital signal in said first section is different from a frequency of the digital signal in said second section, and
computing the correlation values includes converting the frequency of said digital signal of one of said two sections of the frame into a frequency of at least one of said first section and said second section and computing correlation values of said digital signal in the frequency-converted section and said digital signal of the section not frequency-converted;
comparing an absolute value of the correlation values with a reference value and, if said absolute value is found higher than said reference value, detect said absolute value as said maximum value, wherein
said reference value is said maximum value detected last;
storing said maximum value;
executing processing on a digital signal in a start part of said frame on the basis of said timing;
resetting said maximum value after the processing on said start part has ended without detection of new one of said maximum value from starting of the processing; and
resetting said maximum value after the processing on said digital signal of a predetermined number of pieces of data without detection of new one of said maximum value.

8. A receiving system comprising:
circuitry configured to:
acquire a signal from a transmission path; and
execute transmission path decode processing on said acquired signal; said transmission path decode processing including:
for a digital signal, transmitted on a frame basis, having a correlation between a first section and a second section occupying predetermined intervals at a start part of each frame, extracting signals in two sections of a frame separated by time intervals of said first section and said second section and computing correlation values,
detecting every maximum value of said correlation values,
executing Fast Fourier Transform processing on said digital signal on the basis of a timing every time a maximum value has been,
resetting the Fast Fourier Transform processing every time said maximum value is detected, wherein
in the frame, a frequency of the digital signal in said first section is different from a frequency of the digital signal in said second section, and
computing correlation values includes converting the frequency of said digital signal of one of said two sections of the frame into a frequency of at least one of said first section and said second section and computes correlation values of said digital signal in the frequency-converted section and said digital signal of the section not frequency-converted,
comparing an absolute value of the correlation values with a reference value and, if said absolute value is found higher than said reference value, detect said absolute value as said maximum value, wherein
said reference value is said maximum value detected last,
storing said maximum value,
executing processing on a digital signal in a start part of said frame on the basis of said timing,
resetting said maximum value after the processing on said start part has ended without detection of new one of said maximum value from starting of the processing, and
resetting said maximum value after the processing on said digital signal of a predetermined number of pieces of data without detection of new one of said maximum value.

9. A receiving system comprising:
circuitry configured to:
execute transmission path decode processing on a signal acquired from a transmission path; and
execute information source decode processing on said signal after the executed transmission path decode processing;
said transmission path decode processing including:
for a digital signal, transmitted on a frame basis, having a correlation between a first section and a second section occupying predetermined intervals at a start part of each frame, extracting signals in two sections of a frame separated by time intervals of said first section and said second section and computing correlation values,
detecting every maximum value of said correlation values,
executing Fast Fourier Transform processing on said digital signal on the basis of a timing every time a maximum value has been detected,
resetting the Fast Fourier Transform processing every time said maximum value is detected, wherein
in the frame, a frequency of the digital signal in said first section is different from a frequency of the digital signal in said second section, and
computing correlation values includes converting the frequency of said digital signal of one of said two sections of the frame into a frequency of at least one of said first section and said second section and computes correlation values of said digital signal in the frequency-converted section and said digital signal of the section not frequency-converted, comparing an absolute value of the correlation values with a reference value and, if said absolute value is found higher than said reference value, detect said absolute value as said maximum value, wherein said reference value is said maximum value detected last, storing said maximum value, executing processing on a digital signal in a start part of said frame on the basis of said timing, resetting said maximum value after the processing on said start part has ended without detection of new one of said maximum value from starting of the processing, and resetting said maximum value after the processing on said digital signal of a predetermined number of pieces of data without detection of new one of said maximum value.

10. A receiving system comprising:

circuitry configured to:

execute transmission path decode processing on a signal acquired from a transmission path; and output at least one of image data and audio data on the basis of said signal after the executed transmission path decode processing; said transmission path decode processing including:

for a digital signal, transmitted on a frame basis, having a correlation between a first section and a second section occupying predetermined intervals at a start part of each frame, extracting signals in two sections of a frame separated by time intervals of said first section and said second section and computing correlation values, detecting every maximum value of said correlation values, executing Fast Fourier Transform processing on said digital signal on the basis of a timing every time a maximum value has been detected, and resetting the Fast Fourier Transform processing every time said maximum value is detected, wherein in the frame, a frequency of the digital signal in said first section is different from a frequency of the digital signal in said second section, and computing correlation values includes converting the frequency of said digital signal of one of said two sections of the frame into a frequency of at least one of said first section and said second section and computes correlation values of said digital signal in the frequency-converted section and said digital signal of the section not frequency-converted, comparing an absolute value of the correlation values with a reference value and, if said absolute value is found higher than said reference value, detect said absolute value as said maximum value, wherein said reference value is said maximum value detected last, storing said maximum value, executing processing on a digital signal in a start part of said frame on the basis of said timing, resetting said maximum value after the processing on said start part has ended without detection of new one of said maximum value from starting of the processing, and resetting said maximum value after the processing on said digital signal of a predetermined number of pieces of data without detection of new one of said maximum value.

11. A receiving system comprising:

circuitry configured to:

execute transmission path decode processing on a signal acquired from a transmission path; and control recording of said signal after the executed transmission path decode processing;

said transmission path decode processing including:

for a digital signal, transmitted on a frame basis, having a correlation between a first section and a second section occupying predetermined intervals at a start part of each frame, extracting signals in two sections of a frame separated by time intervals of said first section and said second section and computing correlation values, detecting every maximum value of said correlation values, executing Fast Fourier Transform processing on said digital signal on the basis of a timing every time a maximum value has been detected, resetting the Fast Fourier Transform processing every time said maximum value is detected, wherein in the frame, a frequency of the digital signal in said first section is different from a frequency of the digital signal in said second section, and computing correlation values includes converting the frequency of said digital signal of one of said two sections of the frame into a frequency of at least one of said first section and said second section and computes correlation values of said digital signal in the frequency-converted section and said digital signal of the section not frequency-converted, comparing an absolute value of the correlation values with a reference value and, if said absolute value is found higher than said reference value, detect said absolute value as said maximum value, wherein said reference value is said maximum value detected last, storing said maximum value, executing processing on a digital signal in a start part of said frame on the basis of said timing, resetting said maximum value after the processing on said start part has ended without detection of new one of said maximum value from starting of the processing, and resetting said maximum value after the processing on said digital signal of a predetermined number of pieces of data without detection of new one of said maximum value.

* * * * *